US012585089B2

(12) United States Patent
Liu

(10) Patent No.: US 12,585,089 B2
(45) Date of Patent: Mar. 24, 2026

(54) CAMERA OPTICAL LENS

(71) Applicant: Changzhou AAC Raytech Optronics Co., Ltd., Changzhou City (CN)

(72) Inventor: Ziwei Liu, Changzhou (CN)

(73) Assignee: Changzhou AAC Raytech Optronics Co., Ltd., Changzhou City (CN)

( * ) Notice: Subject to any disclaimer, the term of this patent is extended or adjusted under 35 U.S.C. 154(b) by 314 days.

(21) Appl. No.: 18/401,311

(22) Filed: Dec. 29, 2023

(65) Prior Publication Data

US 2025/0093621 A1     Mar. 20, 2025

(30) Foreign Application Priority Data

Sep. 20, 2023    (CN) .......................... 202311217175.3

(51) Int. Cl.
G02B 13/00         (2006.01)
G02B 9/60          (2006.01)
(52) U.S. Cl.
CPC ........... G02B 13/0045 (2013.01); G02B 9/60 (2013.01)

(58) Field of Classification Search
CPC ...... G02B 13/0045; G02B 9/60; G02B 13/00; G02B 13/18; G02B 13/06
See application file for complete search history.

(56) References Cited

U.S. PATENT DOCUMENTS

2022/0206272 A1* 6/2022 Ji ............................. G02B 9/60

* cited by examiner

*Primary Examiner* — Charles S Chang
(74) *Attorney, Agent, or Firm* — Wiersch Law Group

(57)                     ABSTRACT

A camera optical lens includes from an object side to an image side: a first lens, a second lens, a third lens, a fourth lens and a fifth lens. Focal length of camera optical lens is f, focal length of first lens is f1, on-axis thickness of second lens is d3, on-axis distance from image-side surface of second lens to object-side surface of third lens is d4, curvature radius of object-side surface of second lens is R3, curvature radius of image-side surface of second lens is R4, curvature radius of object-side surface of fourth lens is R7, curvature radius of image-side surface of fourth lens is R8, following relational expressions are satisfied: $1.10 \leq f1/f \leq 1.60$; $1.50 \leq d3/d4 \leq 3.50$, $-8.00 \leq R7/R8 \leq -4.00$, $1.00 \leq (R3+R4)/(R3-R4) \leq 1.80$. The camera optical lens has good optical performance such as large-aperture, wide-angle and ultra-thinness.

10 Claims, 15 Drawing Sheets

10

Longitudinal Aberration

Millimeter

30

Si

GF

L5

L4

L3

L2

L1

CAMERA OPTICAL LENS

TECHNICAL FIELD

The present disclosure relates to the field of camera optical lens technologies, and in particular, to a camera optical lens applicable to handheld terminal devices such as smart phones, digital cameras, and camera devices such as monitors and PC lenses.

BACKGROUND

With the development of photographing technologies, camera optical lenses are widely used in various electronic products, such as smart phones and digital cameras. In order to make it easier to carry, people increasingly pursue thin and light electronic products, therefore, the compact camera optical lens with good image quality has become a main-stream in the current market.

For better imaging quality, the conventional lens mounted on a mobile phone camera mostly adopts a three-piece or four-piece lens structure. However, with the development of technology and the increase of diversified requirements of users, a pixel area of the sensitization device is continuously reduced, and the requirements of the system for the imaging quality are improving, the five-piece lens structure is gradually appearing in the lens design, although it has a better optical performance, the optical focal length, lens spacing, and the lens shape settings are still irrational, which leads to the lens structure, while it has a good optical performance, it can't satisfy the requirements of the design of the large-aperture, wide-angle, and ultra-thinness.

Therefore, it is necessary to provide a camera optical lens having good optical performance and meeting the design requirements of large-aperture, wide-angle and ultra-thinness.

SUMMARY

In view of the above problems, an object of the present disclosure is to provide a camera optical lens, which has good optical performance and meets design requirements of large-aperture, ultra-thinness and wide-angle. In order to solve the above technical problem, an embodiment of the present disclosure provides a camera optical lens. The camera optical lens includes from an object side to an image side: from an object side to an image side:

a first lens having a positive refractive power;
a second lens having a negative refractive power;
a third lens having a refractive power;
a fourth lens having a positive refractive power; and
a fifth lens having a negative refractive power;
wherein, a focal length of the camera optical lens is f, a focal length of the first lens is f1, an on-axis thickness of the second lens is d3, an on-axis distance from an image-side surface of the second lens to an object-side surface of the third lens is d4, a curvature radius of an object-side surface of the second lens is R3, a curvature radius of the image-side surface of the second lens is R4, a curvature radius of an object-side surface of the fourth lens is R7, following relational expressions are satisfied:

$$1.10 \leq f1/f \leq 1.60;$$

$$1.50 \leq d3/d4 \leq 3.50;$$

-continued $$-8.00 \leq R7/R8 \leq -4.00; \text{ and}$$

$$1.00 \leq (R3 + R4)/(R3 - R4) \leq 1.80.$$

As an improvement, a focal length of the second lens is f2, a following relational expression is satisfied:

$$-4.50 \leq f2/f \leq -1.40.$$

As an improvement, a total optical length from an object-side surface of the first lens to an image plane of the camera optical lens along an optic axis of the camera optical lens is TTL, and an on-axis thickness of the fifth lens is d9, a following relational expression is satisfied:

$$6.00 \leq TTL/d9 \leq 20.00.$$

As an improvement, an object-side surface of the first lens is convex in a paraxial region, and an image-side surface of the first lens is concave in the paraxial region;

a curvature radius of an object-side surface of the first lens is R1, a curvature radius of an image-side surface of the first lens is R2, a total optical length from the object-side surface of the first lens to an image plane of the camera optical lens along an optic axis of the camera optical lens is TTL, and an on-axis thickness of the first lens is d1, following relational expressions are satisfied:

$$-2.42 \leq (R1 + R2)/(R1 - R2) \leq -1.97; \text{ and}$$

$$0.06 \leq d1/TTL \leq 0.11.$$

As an improvement, an object-side surface of the second lens is convex in a paraxial region, and an image-side surface of the second lens is concave in the paraxial region;

a total optical length from an object-side surface of the first lens to an image plane of the camera optical lens along an optic axis of the camera optical lens is TTL, and an on-axis thickness of the second lens is d3, a following relational expression is satisfied:

$$0.03 \leq d3/TTL \leq 0.06.$$

As an improvement, an object-side surface of the third lens is convex in a paraxial region, and an image-side surface of the third lens is concave in the paraxial region;

a focal length of the third lens is f3, a curvature radius of an object-side surface of the third lens is R5, a curvature radius of an image-side surface of the third lens is R6, a total optical length from an object-side surface of the first lens to an image plane of the camera optical lens along an optic axis of the camera optical lens is TTL, and an on-axis thickness of the third lens is d5, following relational expressions are satisfied:

$$-109.81 \leq f3/f \leq 77.62;$$

$$-29.33 \leq (R5+R6)/(R5-R6) \leq 25.94; \quad \text{and}$$

$$0.10 \leq d5/TTL \leq 0.13.$$

As an improvement, an object-side surface of the fourth lens is convex in a paraxial region, and an image-side surface of the fourth lens is convex in the paraxial region; a focal length of the fourth lens is f4, a curvature radius of an object-side surface of the fourth lens is R7, a curvature radius of an image-side surface of the fourth lens is R8, a total optical length from an object-side surface of the first lens to an image surface of the camera optical lens along an optical axis is TTL, and an on-axis thickness of the fourth lens is d7, following relational expressions are satisfied:

$$0.52 \leq f4/f \leq 0.63;$$

$$0.60 \leq (R7+R8)/(R7-R8) \leq 0.71; \quad \text{and}$$

$$0.15 \leq d7/TTL \leq 0.21.$$

As an improvement, an object-side surface of the fifth lens is convex in a paraxial region, and an image-side surface of the fifth lens is concave in the paraxial region; a focal length of the fifth lens is f5, a curvature radius of an object-side surface of the fifth lens is R9, and a curvature radius of an image-side surface of the fifth lens is R10, following relational expressions are satisfied:

$$-0.66 \leq f5/f \leq -0.55; \quad \text{and}$$

$$1.56 \leq (R9+R10)/(R9-R10) \leq 1.79.$$

As an improvement, a field of view of the camera optical lens is FOV, a following relational expression is satisfied:

$$FOV \geq 75.00°.$$

As an improvement, a half aperture of the object-side surface of the first lens is less than or equal to 0.85 mm.

BRIEF DESCRIPTION OF DRAWINGS

In order to more clearly illustrate technical solutions of embodiments of the present disclosure, the accompanying drawings used in the embodiments are briefly described below. The drawings described below are merely a part of the embodiments of the present disclosure. Based on these drawings, those skilled in the art can obtain other drawings.

DESCRIPTION OF EMBODIMENTS

In order to more clearly illustrate objectives, technical solutions, and advantages of the embodiments of the present disclosure, the technical solutions in the embodiments of the present disclosure are clearly and completely described in details with reference to the accompanying drawings. The described embodiments are merely part of the embodiments of the present disclosure rather than all of the embodiments. All other embodiments obtained by those skilled in the art based on the embodiments of the present disclosure without paying creative labor shall fall into the protection scope of the present disclosure.

Embodiment 1

Figure 1:
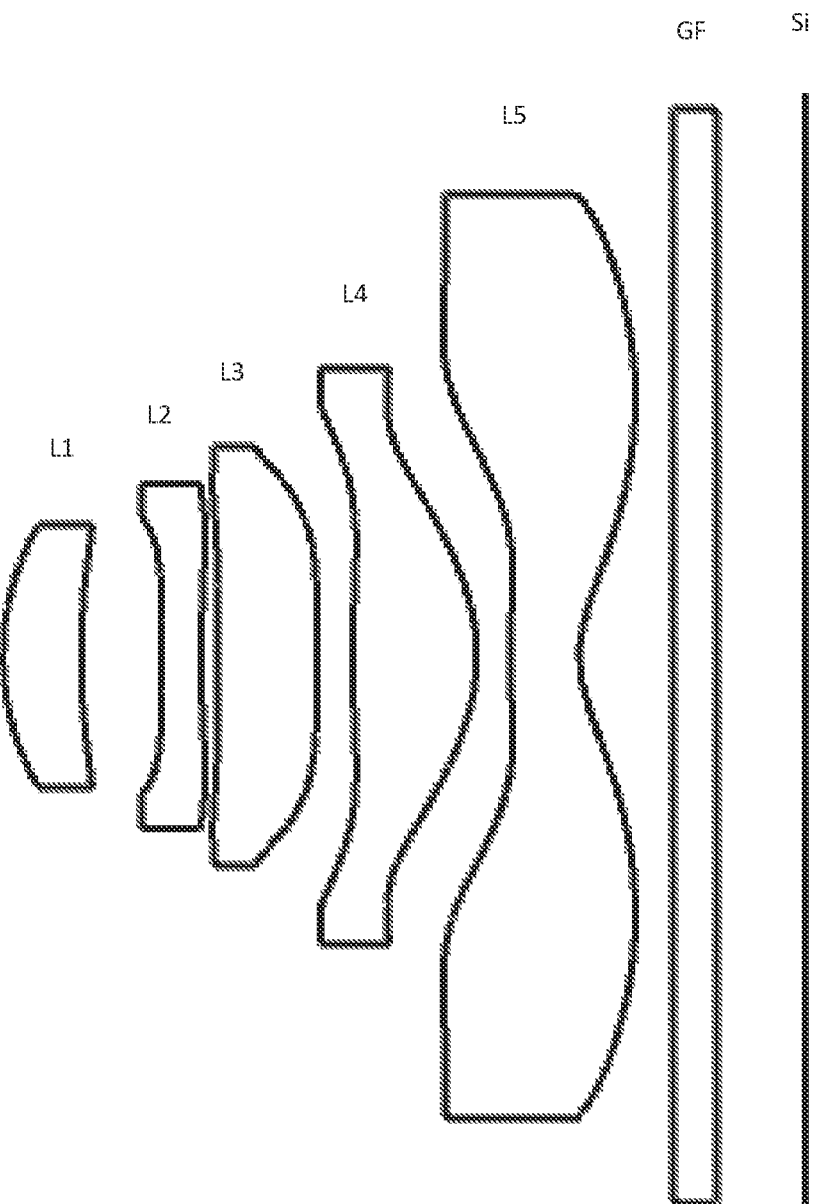
FIG. 1 is a structural schematic diagram of a camera optical lens according to Embodiment 1 of the present disclosure.

As shown in FIG. 1, Embodiment 1 of the present disclosure provides a camera optical lens 10. The camera optical lens 10 includes five lenses. The camera optical lens 10 includes from an image side to an object side: a first lens L1, a second lens L2, a third lens L3, a fourth lens L4, and a fifth lens L5.

In this embodiment, the first lens L1 is made of plastic material, the second lens L2 is made of plastic material, the third lens L3 is made of plastic material, the fourth lens L4 is made of plastic material, and the fifth lens L5 is made of plastic material. In other alternative embodiments, each lens may also be made of other materials. By reasonably configuring the material of the lens, the lens assembly has good optical performance.

In this embodiment, a focal length of the camera optical lens 10 is defined as f, and a focal length of the first lens L1 is defined as f1, a following relational expression is satisfied: $1.10 \leq f1/f \leq 1.60$, which specifies a ratio of the focal length f of the first lens L1 to the focal length f of the camera optical lens 10, within the specified range of the relational expression, can effectively balance the spherical aberration and the field curvature of the system.

In this embodiment, an on-axis thickness of the second lens L2 is defined as d3, and an on-axis distance from an image-side surface of the second lens L2 to an object-side surface of the third lens L3 is defined as d4, a following relational expression is satisfied: $1.50 \leq d3/d4 \leq 3.50$, which specifies a ratio of the on-axis thickness of the second lens L2 to the air gap between the second lens and the third lens L3, within the specified range of the relational expression, helps to compress a total length of the optical system and achieve an ultra-thinness effect. Optionally satisfying: $1.85 \leq d3/d4 \leq 2.63$.

In this embodiment, a curvature radius of the object-side surface of the second lens L2 is defined as R3, and a curvature radius of the image-side surface of the second lens L2 is defined as R4, a following relational expression is satisfied: $1.00 \leq (R3+R4)/(R3-R4) \leq 1.80$, which specifies a shape of the second lens L2, within the specified range of the relational expression, can effectively alleviate the degree of deflection of light passing through the lens, and effectively correct the chromatic aberration. Optionally satisfying: $1.02 \leq (R3+R4)/(R3-R4) \leq 1.40$.

In this embodiment, a curvature radius of the object-side surface of the fourth lens L4 is defined as R7, and a curvature radius of the image-side surface of the fourth lens L4 is defined as R8, a following relational expression is satisfied: $-8.00 \leq R7/R8 \leq -4.00$, which specifies a shape of the fourth lens L4, within the specified range of the relational expression, is beneficial to correct astigmatism and distortion of the camera optical lens 10, so that |Distortion|$\leq$2.5%, thereby reducing the possibility of dark angle generation. Optionally satisfying: $-5.71 \leq R7/R8 \leq -3.99$.

In this embodiment, a focal length of the second lens L2 is defined as f2, a following relational expression is satisfied: $-4.50 \leq f2/f \leq -1.40$, which specifies a ratio of the focal length of the second lens L2 to the focal length f of the camera optical lens 10, within the specified range of the relational expression, can effectively balance the spherical aberration and the field curvature of the system. Optionally satisfying: $-2.45 \leq f2/f \leq -1.48$.

In this embodiment, a total optical length from the object-side surface of the first lens to an image plane of the camera optical lens 10 along an optic axis of the camera optical lens 10 is defined as TTL, and the on-axis thickness of the fifth lens L5 is defined as d9, a following relational expression is satisfied: $6.00 \leq TTL/d9 \leq 20.00$, which specifies a ratio of the total optical length from the object-side surface of the first lens to an image plane of the camera optical lens 10 along an optic axis of the camera optical lens 10 to the on-axis thickness of the fifth lens L5, is beneficial for the system to reasonably distribute the distance of each lens and further reasonably distribute the refractive power. Optionally satisfying: $10.61 \leq TTL/d9 \leq 11.83$.

In this embodiment, the first lens L1 has a positive refractive power, an object-side surface of the first lens L1 is convex in the paraxial region, and an image-side surface of the first lens L1 is concave in the paraxial region. In other optional embodiments, the object-side surface and the image-side surface of the first lens L1 may also be provided with other concave and convex distributions, and the first lens L1 may also have a negative refractive power.

In this embodiment, a curvature radius of the object-side surface of the first lens L1 is defined as R1, and a curvature radius of the image-side surface of the first lens L1 is defined as R2. $-2.42 \leq (R1+R2)/(R1-R2) \leq -1.97$, which specifies a shape of the first lens L1, within the specified range of the relational expression, can effectively alleviate the degree of deflection of light passing through the lens and effectively correct the chromatic aberration.

In this embodiment, an on-axis thickness of the first lens is defined as d1, a following relational expression is satisfied: $0.06 \leq d1/TTL \leq 0.11$, which specifies a ratio of the total optical length from the object-side surface of the first lens to an image plane of the camera optical lens 10 along an optic axis of the camera optical lens 10 to the on-axis thickness of the first lens L1, is beneficial for the system to reasonably distribute the distance of each lens and further reasonably distribute the refractive power.

In this embodiment, the second lens L2 has a negative refractive power, an object-side surface of the second lens L2 is convex in the paraxial region, and an image-side surface of the second lens L2 is concave in the paraxial region. In other optional embodiments, the object-side surface and the image-side surface of the second lens L2 may also be provided with other concave and convex distribution, and the second lens L2 may also have a positive refractive power.

In this embodiment, an on-axis thickness of the second lens L2 is defined as d3, a following relational expression is satisfied: $0.03 \leq d3/TTL \leq 0.06$, which specifies a ratio of the total optical length from the object-side surface of the first lens to an image plane of the camera optical lens 10 along an optic axis of the camera optical lens 10 to the on-axis thickness of the second lens L2, is beneficial for the system to reasonably distribute the distance of each lens and further reasonably distribute the refractive power.

In this embodiment, the third lens L3 has a negative refractive power, an object-side surface of the third lens L3 is convex in the paraxial region, and an image-side surface of the third lens L3 is concave in the paraxial region. In other optional embodiments, the object-side surface and the image-side surface of the third lens L3 may also be provided with other concave and convex distributions, and the third lens L3 may also have a positive refractive power.

In this embodiment, a focal length of the third lens L3 is defined as f3, a following relational expression is satisfied: $-109.81 \leq f3/f \leq 77.62$, which specifies a ratio of the focal length f of the third lens L3 to the focal length f of the camera optical lens 10, within the specified range of the relational expression, can effectively balance the spherical aberration and the field curvature of the system.

In this embodiment, a curvature radius of the object-side surface of the third lens L3 is defined as R5, and a curvature radius of the image-side surface of the third lens L3 is defined as R6. $-29.33 \leq (R5+R6)/(R5-R6) \leq 25.94$, which specifies a shape of the third lens L3, within the specified range of the relational expression, can effectively alleviate the degree of deflection of light passing through the lens and effectively correct the chromatic aberration.

In this embodiment, an on-axis thickness of the third lens L3 is defined as d5, a following relational expression is satisfied: $0.10 \leq d5/TTL \leq 0.13$, which specifies a ratio of the total optical length from the object-side surface of the first lens to an image plane of the camera optical lens 10 along an optic axis of the camera optical lens 10 to the on-axis thickness of the third lens L3, is beneficial for the system to reasonably distribute the distance of each lens and further reasonably distribute the refractive power.

In this embodiment, the fourth lens L4 has a positive refractive power, an object-side surface of the fourth lens L4 is convex in the paraxial region, and an image-side surface of the fourth lens L4 is convex in the paraxial region. In other optional embodiments, the object-side surface and the image-side surface of the fourth lens L4 may also be provided with other concave and convex distributions, and the fourth lens L4 may also have a negative refractive power.

In this embodiment, the focal length of the fourth lens L4 is defined as f4, a following relational expression is satisfied: $0.52 \leq f4/f \leq 0.63$, which specifies a ratio of the focal length f of the fourth lens L4 to the focal length f of the camera optical lens 10, within the specified range of the relational expression, can effectively balance the spherical aberration and the field curvature of the system.

In this embodiment, a curvature radius of the object-side surface of the fourth lens L4 is defined as R7, and a curvature radius of the image-side surface of the fourth lens L4 is defined as R8, a following relational expression is satisfied: $0.60 \leq (R7+R8)/(R7-R8) \leq 0.71$, which specifies the shape of the fourth lens L4, within the specified range of the relational expression, can effectively alleviate the degree of deflection of light passing through the lens and effectively correct the chromatic aberration.

In this embodiment, an on-axis thickness of the fourth lens L4 is defined as d7, a following relational expression is satisfied: $0.15 \leq d7/TTL \leq 0.21$, which specifies a ratio of the total optical length from the object-side surface of the first lens to an image plane of the camera optical lens 10 along an optic axis of the camera optical lens 10 to the on-axis distance of the fourth lens L4, is beneficial for the system to reasonably distribute the distance of each lens and further reasonably distribute the refractive power.

In this embodiment, the fifth lens L5 has a negative refractive power, an object-side surface of the fourth lens L5 is convex in the paraxial region, and an image-side surface of the fifth lens L5 is concave in the paraxial region. In other optional embodiments, the object-side surface and the image-side surface of the fifth lens L5 may also be provided with other concave and convex distributions, and the fifth lens L5 may also have positive refractive power.

In this embodiment, the focal length of the fifth lens L5 is defined as f5, a following relational expression is satisfied: $-0.66 \leq f5/f \leq -0.55$, which specifies a ratio of the focal length of the fifth lens L5 to the focal length f of the camera optical lens 10, within the specified range of the relational expression, can effectively balance the spherical aberration and the field curvature of the system.

In this embodiment, a curvature radius of the object-side surface of the fifth lens L5 is defined as R9, and a curvature radius of the image-side surface of the fifth lens L5 is defined as R10, a following relational expression is satisfied: $1.56 \leq (R9+R10)/(R9-R10) \leq 1.79$, which specifies a shape of the fifth lens L5, within the specified range of the relational expression, can effectively alleviate the degree of deflection of light passing through the lens and effectively correct the chromatic aberration.

In this embodiment, a field of view of the camera optical lens 10 is defined as FOV, a following relational expression is satisfied: $FOV \geq 75.00°$, and a larger field of view brings better user experience.

In this embodiment, an F Number of the camera optical lens 10 is defined as FNO, a following relational expression is satisfied: $FNO \leq 2.27$, a large aperture is achieved, and the camera optical lens 10 has good imaging performance. Optionally satisfying: $FNO \leq 2.20$.

In this embodiment, the half aperture of the object-side surface of the first lens L1 is defined as SD, $SD \leq 0.85$ mm, which is beneficial to achieving a small head and achieving an ultra-thinness effect.

In this embodiment, a combined focal length of the first lens L1 and the second lens L2 is defined as f12, further satisfying the following expression: $2.37 \leq f12/f \leq 3.31$. Within the range of the relational expression, the aberration and distortion of the camera optical lens 10 can be eliminated, and the back focal length of the camera optical lens 10 can be suppressed to maintain the miniaturization of the image lens system group.

When the above relationship is satisfied, the camera optical lens 10 satisfies the design requirements of wide-angle and ultra-thinness while having a large aperture with good optical performance, and is particularly suitable for a mobile phone camera lens assembly and a WEB camera lens composed of camera elements such as CCD and CMOS for high pixels.

The camera optical lens 10 of the present disclosure will be described below with examples. The symbols recited in each example are as follows: The unit of the focal length, the on-axis distance, curvature radius, the on-axis thickness, the position of the inflection point, and the position of the stationary point is mm.

TTL: The unit of the total optical length (a total optical length from the object-side surface of the first lens L1 to an image plane Si of the camera optical lens 10 along an optic axis) is mm.

An F Number FNO: refers to a ratio of the effective focal length of the camera optical lens 10 to the entrance pupil diameter.

In addition, at least one of the object-side surface and the image-side surface of each lens may be further provided with an inflection point and/or a stationary point, so as to meet high-quality imaging requirements.

Table 1 and Table 2 show design data of the camera optical lens 10 shown in FIG. 1.

TABLE 1

|  | R |  | d |  | nd |  | vd |
| --- | --- | --- | --- | --- | --- | --- | --- |
| S1 | ∞ | d0= | −0.152 |  |  |  |  |
| R1 | 1.325 | d1= | 0.378 | nd1 | 1.5444 | v1 | 0.00 |
| R2 | 3.332 | d2= | 0.391 |  |  |  |  |
| R3 | 48.528 | d3= | 0.190 | nd2 | 1.6770 | v2 | 19.40 |
| R4 | 3.902 | d4= | 0.082 |  |  |  |  |
| R5 | 10.883 | d5= | 0.478 | nd3 | 1.5629 | v3 | 42.68 |
| R6 | 10.075 | d6= | 0.177 |  |  |  |  |
| R7 | 5.399 | d7= | 0.601 | nd4 | 1.5440 | v4 | 56.00 |
| R8 | −0.947 | d8= | 0.158 |  |  |  |  |
| R9 | 2.196 | d9= | 0.339 | nd5 | 1.5535 | v5 | 48.30 |
| R10 | 0.621 | d10= | 0.454 |  |  |  |  |
| R11 | ∞ | d11= | 0.210 | ndg | 1.5168 | vg | 64.17 |
| R12 | ∞ | d12= | 0.426 |  |  |  |  |

The meaning of each symbol in the above table is as follows:

S1: aperture;

R: curvature radius at the center of the optical surface;

R1: curvature radius of the object-side surface of the first lens L1;

R2: curvature radius of the image-side surface of the first lens L1;

R3: curvature radius of the object-side surface of the second lens L2;

R4: curvature radius of the image-side surface of the second lens L2;

R5: curvature radius of the object-side surface of the third lens L3;

R6: curvature radius of the image-side surface of the third lens L3;

R7: curvature radius of the object-side surface of the fourth lens L4;

R8: curvature radius of the image-side surface of the fourth lens L4;

R9: curvature radius of the object-side surface of the fifth lens L5;

R10: curvature radius of the image-side surface of the fifth lens L5;

R11: curvature radius of the object-side surface of the optical filter GF;

R12: curvature radius of the image-side surface of the optical filter GF;

d: on-axis thickness of lenses, on-axis distance between lenses;

d0: on-axis distance from the aperture S1 to the object-side surface of the first lens L1;

nd: refractive index of the d line;

nd1: refractive index of d line of the first lens L1;

nd2: refractive index of d line of the second lens L2;

nd3: refractive index of d line of the third lens L3;

nd4: refractive index of d line of the fourth lens L4;

nd5: refractive index of d line of the fifth lens L5;

ndg: refractive index of d line of the optical filter GF;

vd: abbe number;

v1: abbe number of the first lens L1;

v2: abbe number of the second lens L2;

v3: abbe number of the third lens L3;

v4: abbe number of the fourth lens L4;

v5: abbe number of the fifth lens L5;

vg: abbe number of the optical filter GF.

Table 2 shows aspherical surface data of each lens in the camera optical lens 10 according to Embodiment 1 of the present disclosure.

TABLE 2

| | Conic coefficient | Aspheric coefficient | | | | |
|---|---|---|---|---|---|---|
| | k | A4 | A6 | A8 | A10 | A12 |
| R1 | 1.0492E−01 | 2.2239E−03 | 4.6556E−01 | −6.3398E+00 | 5.3952E+01 | −2.8881E+02 |
| R2 | −8.0731E−01 | 1.2959E−04 | 8.5089E−03 | −5.7747E−01 | 9.5548E−01 | 1.5041E+01 |
| R3 | −6.4716E+01 | −3.4022E−01 | 8.6705E−01 | −7.7879E+00 | 3.0532E+01 | −6.6811E+01 |
| R4 | −3.1944E+01 | −3.8600E−01 | 2.2307E+00 | −1.1436E+01 | 3.9099E+01 | −9.1620E+01 |
| R5 | 4.1740E+01 | −5.3250E−01 | 2.2994E+00 | −8.7037E+00 | 2.5922E+01 | −5.6304E+01 |
| R6 | 2.0840E+01 | −5.0556E−01 | 9.1125E−01 | −4.0449E+00 | 1.3921E+01 | −3.2583E+01 |
| R7 | −3.3311E+01 | −1.0769E−01 | 1.9142E−01 | −1.8643E+00 | 6.5419E+00 | −1.3565E+01 |
| R8 | −1.4855E+00 | 2.0332E−01 | 9.2599E−02 | −2.3300E+00 | 7.7877E+00 | −1.4241E+01 |
| R9 | −7.8479E+01 | −3.4236E−01 | −4.2520E−01 | 1.6685E+00 | −2.3583E+00 | 2.0158E+00 |
| R10 | −4.0766E+00 | −3.6139E−01 | 4.0452E−01 | −3.1669E−01 | 1.7633E−01 | −7.0461E−02 |

| | Conic coefficient | Aspheric coefficient | | | |
|---|---|---|---|---|---|
| | k | A14 | A16 | A18 | A20 |
| R1 | 1.0492E−01 | 9.7547E+02 | −2.0186E+03 | 2.3345E+03 | −1.1565E+03 |
| R2 | −8.0731E−01 | −1.3550E+02 | 4.7560E+02 | −7.9884E+02 | 5.2458E+02 |
| R3 | −6.4716E+01 | 3.2079E+01 | 1.7778E+02 | −3.9357E+02 | 2.5433E+02 |
| R4 | −3.1944E+01 | 1.4398E+02 | −1.4356E+02 | 8.1413E+01 | −1.9841E+01 |
| R5 | 4.1740E+01 | 8.3181E+01 | −7.7226E+01 | 4.0300E+01 | −8.9980E+00 |
| R6 | 2.0840E+01 | 4.8834E+01 | −4.4860E+01 | 2.2973E+01 | −4.9764E+00 |
| R7 | −3.3311E+01 | 1.8362E+01 | −1.6726E+01 | 1.0293E+01 | −4.1507E+00 |
| R8 | −1.4855E+00 | 1.6583E+01 | −1.2633E+01 | 6.2457E+00 | −1.9290E+00 |
| R9 | −7.8479E+01 | −1.1296E+00 | 4.2274E−01 | −1.0478E−01 | 1.6529E−02 |
| R10 | −4.0766E+00 | 2.0133E−02 | −4.0654E−03 | 5.6936E−04 | −5.3456E−05 | d1: on-axis thickness of the first lens L1;

d2: on-axis distance from the image-side surface of the first lens L1 to the object-side surface of the second lens L2;

d3: on-axis thickness of the second lens L2;

d4: on-axis distance from the image-side surface of the second lens L2 to the object-side surface of the third lens L3;

d5: on-axis thickness of the third lens L3;

d6: on-axis distance from the image-side surface of the third lens L3 to the object-side surface of the fourth lens L4;

d7: on-axis thickness of the fourth lens L4;

d8: on-axis distance from the image-side surface of the fourth lens L4 to the object-side surface of the fifth lens L5;

d9: on-axis thickness of the fifth lens L5;

d10: on-axis distance from the image-side surface of the fifth lens L5 to the object-side surface of the optical filter GF;

d11: on-axis thickness of the optical filter GF;

d12: on-axis distance from the image-side surface of the optical filter GF to the image plane Si;

Wherein, k is a conic coefficient, A4, A6, A8, A10, A12, A14, A16, A18 and A20 are aspheric coefficient.

$$y = \left(x^2/R\right)\Big/\left[1 + \left\{1 - (k+1)\left(x^2R^2\right)\right\}^{1/2}\right] + A^4x^4 + A^6x^6 + \qquad (1)$$
$$A^8x^8 + A^{10}x^{10} + A^{12}x^{12} + A^{14}x^{14} + A^{16}x^{16} + A^{18}x^{18} + A^{20}x^{20}$$

Wherein, x is a vertical distance between a point on the aspheric curve and the optical axis, and y is a depth of the aspheric surface (a vertical distance between a point on the aspheric surface at a distance x from the optical axis and a tangent plane tangent to a vertex on the aspheric optical axis).

For convenience, the aspheric surface of each lens surface uses the aspheric surface shown in the above formula (1). However, the present disclosure is not limited to the aspheric polynomial form represented by the formula (1).

Table 3 and Table 4 show design data of inflection points and stationary points of each lens in the camera optical lens 10 of the present embodiment. Wherein, P1R1 and P1R2 respectively represent the object-side surface and the image-side surface of the first lens L1, P2R1 and P2R2 respectively represent the object-side surface and the image-side surface of the second lens L2, P3R1 and P3R2 respectively represent the object-side surface and the image-side surface of the third lens L3, P4R1 and P4R2 respectively represent the object-side surface and the image-side surface of the fourth lens L4, P5R1 and P5R2 respectively represent the object-side surface and the image-side surface of the fifth lens L5. The corresponding data in the column "inflection point position" is the vertical distance from the inflection point provided with the surface of each lens to the optical axis of the camera optical lens 10. The corresponding data in the column "stationary point position" is a vertical distance from the stationary point provided with the surface of each lens to the optical axis of the camera optical lens 10.

Embodiment 2

Figure 5:
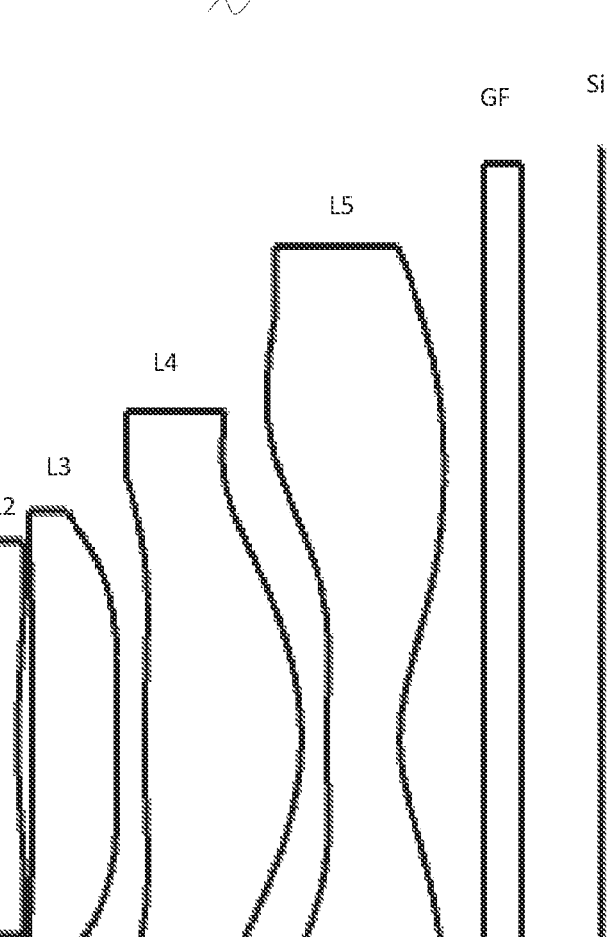
FIG. 5 is a structural schematic diagram of a camera optical lens as described in Embodiment 2 of the present disclosure.

FIG. 5 is a structural schematic diagram of the camera optical lens 20 in Embodiment 2, Embodiment 2 is substantially the same as Embodiment 1, and the symbols in the following list have the same meaning as those in Embodiment 1, so the same parts are not described herein again.

In Embodiment 2, the third lens L3 has a positive refractive power.

Table 5 and Table 6 show design data of the camera optical lens 20 shown in FIG. 5.

TABLE 3

|  | Number of inflection points | Inflection points position 1 | Inflection points position 2 | Inflection points position 3 | Inflection points position 4 | Inflection points position 5 | Inflection points position 6 |
|---|---|---|---|---|---|---|---|
| P1R1 | 0 | / | / | / | / | / | / |
| P1R2 | 1 | 0.525 | / | / | / | / | / |
| P2R1 | 1 | 0.075 | / | / | / | / | / |
| P2R2 | 1 | 0.335 | / | / | / | / | / |
| P3R1 | 2 | 0.135 | 0.705 | / | / | / | / |
| P3R2 | 2 | 0.135 | 0.935 | / | / | / | / |
| P4R1 | 2 | 0.345 | 1.155 | / | / | / | / |
| P4R2 | 1 | 0.825 | / | / | / | / | / |
| P5R1 | 3 | 0.215 | 1.035 | 1.795 | / | / | / |
| P5R2 | 1 | 0.415 | / | / | / | / | / |

TABLE 4

|  | Number of stationary points | Stationary point position 1 | Stationary point position 2 | Stationary point position 3 | Stationary point position 4 | Stationary point position 5 |
|---|---|---|---|---|---|---|
| P1R1 | 0 | / | / | / | / | / |
| P1R2 | 0 | / | / | / | / | / |
| P2R1 | 1 | 0.125 | / | / | / | / |
| P2R2 | 1 | 0.585 | / | / | / | / |
| P3R1 | 2 | 0.255 | 0.855 | / | / | / |
| P3R2 | 1 | 0.235 | / | / | / | / |
| P4R1 | 1 | 0.555 | / | / | / | / |
| P4R2 | 1 | 1.265 | / | / | / | / |
| P5R1 | 2 | 0.395 | 1.615 | / | / | / |
| P5R2 | 1 | 1.275 | / | / | / | / |

Figure 2:
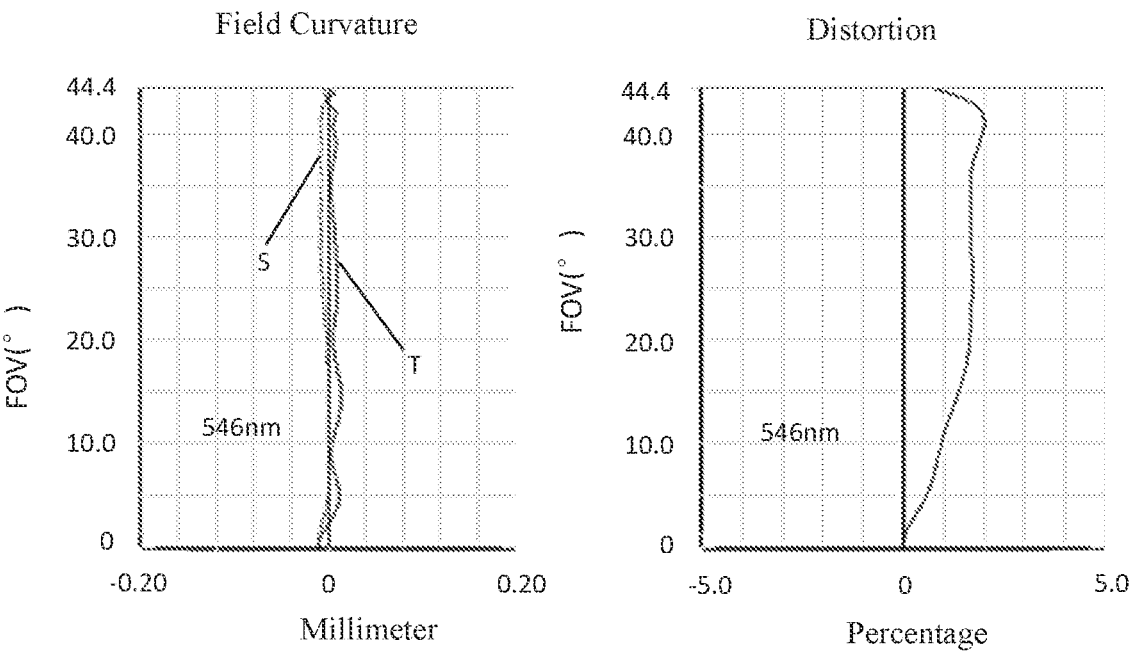
FIG. 2 is a schematic diagram of field curvature and distortion of a camera optical lens shown in FIG. 1.
Figure 3:
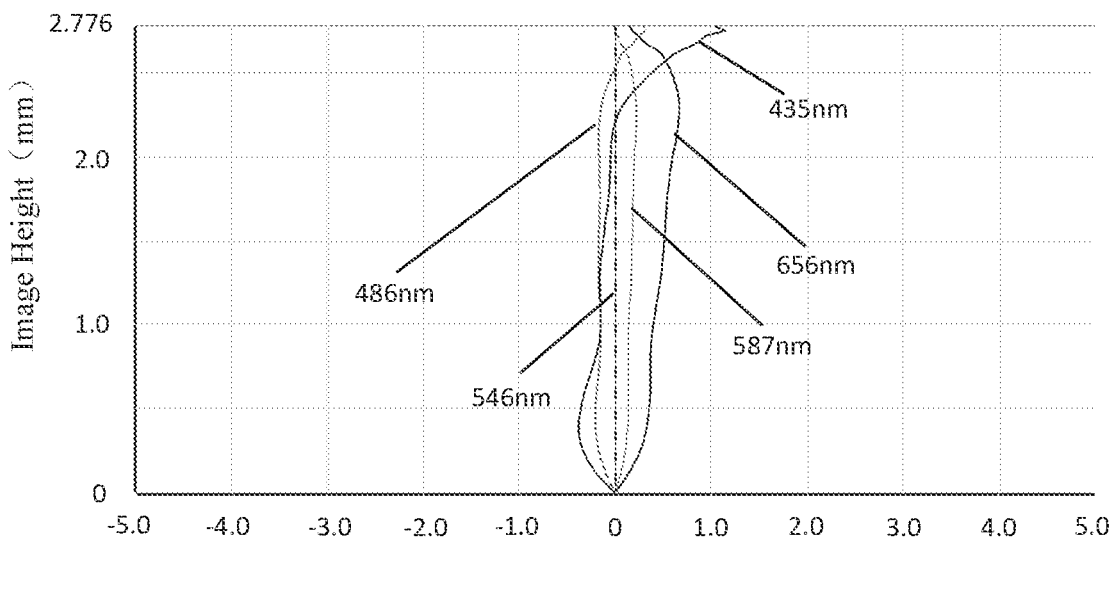
FIG. 3 is a schematic diagram of lateral color of the camera optical lens shown in FIG. 1.
Figure 4:
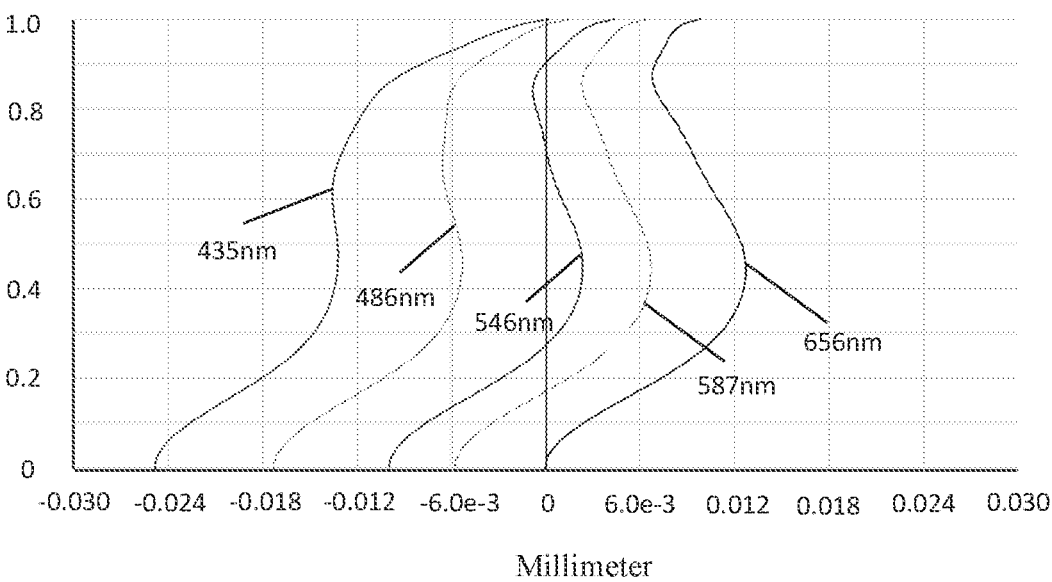
FIG. 4 is a schematic diagram of longitudinal aberration of the camera optical lens shown in FIG. 1.

FIG. 2 shows a schematic diagram of the field curvature and distortion of light with a wavelength of 546 nm after passing through the camera optical lens 10. The field curvature S in FIG. 2 is the field curvature in the sagittal direction, and Tis the field curvature in the meridional direction. FIG. 3 and FIG. 4 shows a schematic diagram of the lateral color and longitudinal aberration of light with a wavelength of 656 nm, 587 nm, 546 nm, 486 nm and 435 nm, after passing through the camera optical lens 10.

As shown in Table 21, Embodiment 1 satisfies each relational expression.

In this embodiment, the entrance pupil diameter ENPD of the camera optical lens 10 is 1.263 mm, the full field of view image height IH is 2.626 mm, and the field of view FOV in the diagonal direction is 85.00°, so that the camera optical lens 10 meets the design requirements of a large-aperture, a wide-angle, and an ultra-thinness, and the on-axis and off-axis chromatic aberration thereof is sufficiently compensated for, and it has excellent optical characteristics.

TABLE 5

|  | R |  | d |  | nd |  | vd |
|---|---|---|---|---|---|---|---|
| S1 | ∞ | d0= | −0.188 |  |  |  |  |
| R1 | 1.408 | d1= | 0.478 | nd1 | 1.5444 | v1 | 0.00 |
| R2 | 4.301 | d2= | 0.485 |  |  |  |  |
| R3 | 255.128 | d3= | 0.150 | nd2 | 1.6770 | v2 | 19.40 |
| R4 | 3.299 | d4= | 0.081 |  |  |  |  |
| R5 | 12.079 | d5= | 0.480 | nd3 | 1.5903 | v3 | 32.38 |
| R6 | 12.932 | d6= | 0.153 |  |  |  |  |
| R7 | 5.021 | d7= | 0.884 | nd4 | 1.5476 | v4 | 46.55 |
| R8 | −1.098 | d8= | 0.144 |  |  |  |  |
| R9 | 3.434 | d9= | 0.411 | nd5 | 1.5626 | v5 | 42.82 |
| R10 | 0.753 | d10= | 0.478 |  |  |  |  |
| R11 | ∞ | d11= | 0.210 | ndg | 1.5168 | vg | 64.17 |
| R12 | ∞ | d12= | 0.449 |  |  |  |  |

Table 6 shows aspherical surface data of each lens in the camera optical lens 20 as described in Embodiment 2 of the present disclosure.

TABLE 6

| | Conic coefficient | Aspheric coefficient | | | | |
|---|---|---|---|---|---|---|
| | k | A4 | A6 | A8 | A10 | A12 |
| R1 | 1.1405E−01 | 4.5473E−03 | 1.8743E−01 | −1.7454E+00 | 1.0346E+01 | −3.8000E+01 |
| R2 | 5.2943E+00 | −5.6079E−03 | 1.3325E−01 | −1.8296E+00 | 1.2634E+01 | −5.3549E+01 |
| R3 | 9.9000E+01 | −3.2576E−01 | 9.0471E−01 | −5.6490E+00 | 1.6801E+01 | −2.8207E+01 |
| R4 | −1.2132E+01 | −3.4277E−01 | 1.8084E+00 | −7.4571E+00 | 1.9926E+01 | −3.6034E+01 |
| R5 | 6.9052E+01 | −3.6341E−01 | 1.2976E+00 | −3.5404E+00 | 7.9513E+00 | −1.5652E+01 |
| R6 | 9.9000E+01 | −3.5991E−01 | 1.8455E−01 | −8.1962E−01 | 3.5943E+00 | −9.1868E+00 |
| R7 | −1.2399E+01 | −6.7513E−02 | −2.4736E−01 | 2.3671E−01 | 3.3150E−01 | −1.1293E+00 |
| R8 | −1.4151E+00 | 2.0066E−01 | −3.4456E−01 | 2.3739E−01 | 2.9269E−01 | −9.0956E−01 |
| R9 | −9.9000E+01 | −3.4507E−01 | −1.0598E−01 | 6.8741E−01 | −8.7971E−01 | 6.6457E−01 |
| R10 | −4.1211E+00 | −3.2018E−01 | 3.4274E−01 | −2.7389E−01 | 1.6400E−01 | −7.3164E−02 |

| | Conic coefficient | Aspheric coefficient | | | |
|---|---|---|---|---|---|
| | k | A14 | A16 | A18 | A20 |
| R1 | 1.1405E−01 | 8.7394E+01 | −1.2260E+02 | 9.5960E+01 | −3.2235E+01 |
| R2 | 5.2943E+00 | 1.3801E+02 | −2.1227E+02 | 1.7818E+02 | −6.2911E+01 |
| R3 | 9.9000E+01 | 1.8508E+01 | 1.5373E+01 | −3.7246E+01 | 2.0320E+01 |
| R4 | −1.2132E+01 | 4.4135E+01 | −3.5131E+01 | 1.6266E+01 | −3.2773E+00 |
| R5 | 6.9052E+01 | 2.3582E+01 | −2.2932E+01 | 1.2430E+01 | −2.8371E+00 |
| R6 | 9.9000E+01 | 1.3847E+01 | −1.2405E+01 | 6.1460E+00 | −1.2848E+00 |
| R7 | −1.2399E+01 | 1.4868E+00 | −1.1717E+00 | 6.1425E−01 | −2.2208E−01 |
| R8 | −1.4151E+00 | 1.1490E+00 | −8.5500E−01 | 3.9201E−01 | −1.0886E−01 |
| R9 | −9.9000E+01 | −3.3070E−01 | 1.1062E−01 | −2.4631E−02 | 3.5059E−03 |
| R10 | −4.1211E+00 | 2.3912E−02 | −5.5885E−03 | 9.0133E−04 | −9.4595E−05 |

Table 7 and Table 8 show design data of inflection points and stationary points of each lens in the camera optical lens 20 of the present embodiment.

TABLE 7

| | Number of inflection points | Inflection points position 1 | Inflection points position 2 | Inflection points position 3 | Inflection points position 4 | Inflection points position 5 | Inflection points position 6 |
|---|---|---|---|---|---|---|---|
| P1R1 | 0 | / | / | / | / | / | / |
| P1R2 | 1 | 0.625 | / | / | / | / | / |
| P2R1 | 1 | 0.035 | / | / | / | / | / |
| P2R2 | 1 | 0.455 | / | / | / | / | / |
| P3R1 | 2 | 0.155 | 0.785 | / | / | / | / |
| P3R2 | 2 | 0.145 | 0.975 | / | / | / | / |
| P4R1 | 1 | 0.355 | / | / | / | / | / |
| P4R2 | 1 | 0.885 | / | / | / | / | / |
| P5R1 | 2 | 0.215 | 1.065 | / | / | / | / |
| P5R2 | 1 | 0.445 | / | / | / | / | / |

TABLE 8

| | Number of stationary points | Stationary point position 1 | Stationary point position 2 | Stationary point position 3 | Stationary point position 4 | Stationary point position 5 |
|---|---|---|---|---|---|---|
| P1R1 | 0 | / | / | / | / | / |
| P1R2 | 0 | / | / | / | / | / |
| P2R1 | 1 | 0.055 | / | / | / | / |
| P2R2 | 1 | 0.755 | / | / | / | / |
| P3R1 | 2 | 0.305 | 0.935 | / | / | / |
| P3R2 | 1 | 0.235 | / | / | / | / |
| P4R1 | 1 | 0.585 | / | / | / | / |
| P4R2 | 1 | 1.345 | / | / | / | / |
| P5R1 | 2 | 0.375 | 1.605 | / | / | / |
| P5R2 | 1 | 1.275 | / | / | / | / |

Figure 6:
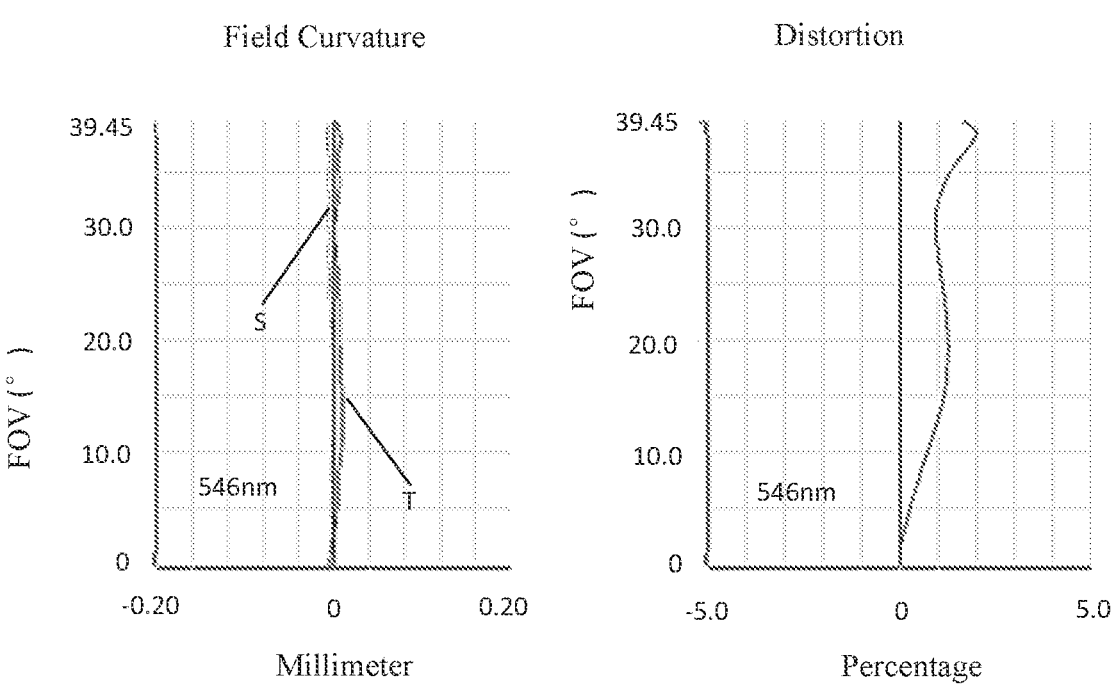
FIG. 6 is a schematic diagram of field curvature and distortion of the camera optical lens shown in FIG. 5.
Figure 7:
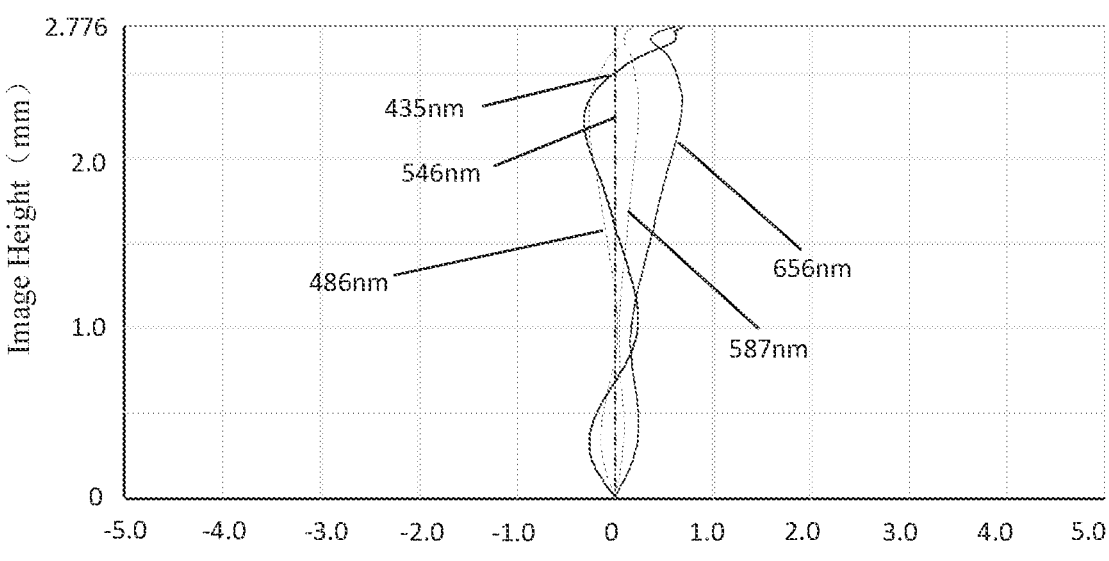
FIG. 7 is a schematic diagram of lateral color of the camera optical lens shown in FIG. 5.
Figure 8:
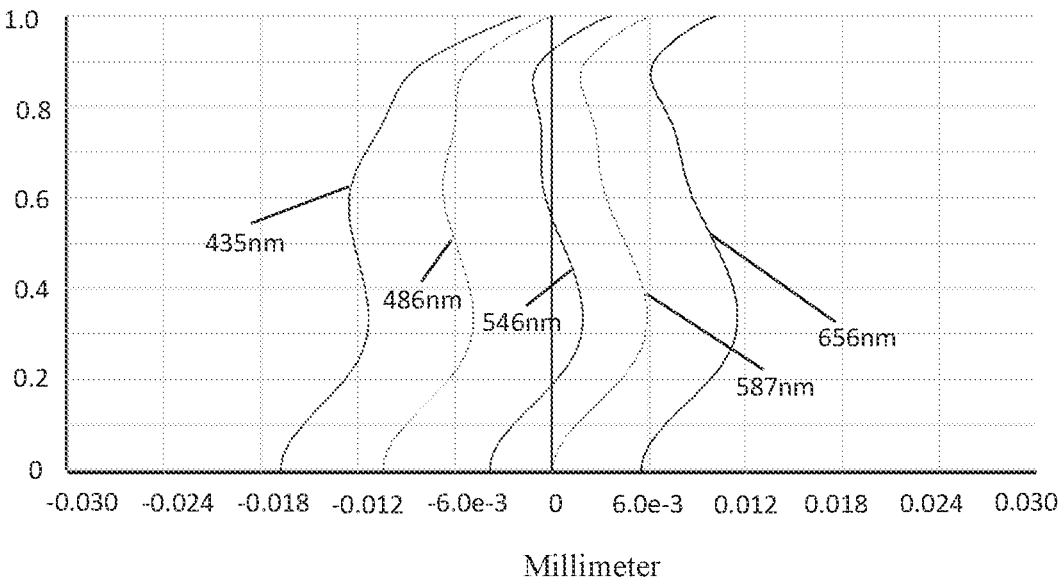
FIG. 8 is a schematic diagram of longitudinal aberration of the camera optical lens shown in FIG. 5.

FIG. 6 shows field curvature and distortion of light with a wavelength of 546 nm after passing through the camera optical lens 20. The field curvature S in FIG. 6 is the field curvature in the sagittal direction, and T is the field curvature in the meridional direction. FIG. 7 and FIG. 8 respectively show lateral color and longitudinal aberration of light with wavelengths of 656 nm, 587 nm, 546 nm, 486 nm and 435 nm after passing through the camera optical lens 20.

As shown in Table 21, Embodiment 2 satisfies each relational expression.

In this embodiment, the entrance pupil diameter ENPD of the camera optical lens 20 is 1.490 mm, the full field of view image height IH is 2.626 mm, and the field of view FOV in the diagonal direction is 75.66°, so that the camera optical lens 20 meets the design requirements of a large-aperture, a wide-angle, and an ultra-thinness, and the on-axis and off-axis chromatic aberration thereof is sufficiently compensated for, and it has excellent optical characteristics.

Embodiment 3

Figure 9:
FIG. 9 is a structural schematic diagram of a camera optical lens as described in Embodiment 3 of the present disclosure.

FIG. 9 is a structural schematic diagram of the camera optical lens 30 in Embodiment 3, Embodiment 3 is substantially the same as Embodiment 1, and the symbols in the following list have the same meaning as those in Embodiment 1, so the same parts are not described herein again.

In Embodiment 3, the third lens L3 has a positive refractive power.

Table 9 and Table 10 show design data of the camera optical lens 30 shown in FIG. 9.

TABLE 9

|  | R |  | d |  | nd |  | vd |
|---|---|---|---|---|---|---|---|
| S1 | ∞ | d0= | −0.114 |  |  |  |  |
| R1 | 1.327 | d1= | 0.287 | nd1 | 1.5444 | v1 | 0.00 |
| R2 | 3.259 | d2= | 0.415 |  |  |  |  |
| R3 | 33.441 | d3= | 0.197 | nd2 | 1.6770 | v2 | 19.40 |
| R4 | 3.754 | d4= | 0.075 |  |  |  |  |
| R5 | 9.432 | d5= | 0.478 | nd3 | 1.5621 | v3 | 43.11 |
| R6 | 10.451 | d6= | 0.170 |  |  |  |  |
| R7 | 4.087 | d7= | 0.670 | nd4 | 1.5440 | v4 | 56.00 |
| R8 | −1.022 | d8= | 0.212 |  |  |  |  |
| R9 | 2.566 | d9= | 0.361 | nd5 | 1.5531 | v5 | 43.31 |
| R10 | 0.656 | d10= | 0.393 |  |  |  |  |
| R11 | ∞ | d11= | 0.210 | ndg | 1.5168 | vg | 64.17 |
| R12 | ∞ | d12= | 0.365 |  |  |  |  |

Table 10 shows aspherical surface data of each lens in the camera optical lens 30 as described in Embodiment 3 of the present disclosure.

TABLE 10

| | Conic coefficient | Aspheric coefficient | | | | |
|---|---|---|---|---|---|---|
| | k | A4 | A6 | A8 | A10 | A12 |
| R1 | 1.3370E−01 | 1.2695E−02 | 3.6353E−01 | −4.7691E+00 | 3.9952E+01 | −2.1080E+02 |
| R2 | −2.5834E−01 | 1.1826E−02 | −2.1442E−01 | 3.0207E+00 | −3.2436E+01 | 2.0608E+02 |
| R3 | −8.8577E+01 | −3.3508E−01 | 7.4050E−01 | −6.7821E+00 | 2.5246E+01 | −4.7419E+01 |
| R4 | −2.9956E+01 | −3.6159E−01 | 1.8909E+00 | −9.1811E+00 | 3.0102E+01 | −6.8173E+01 |
| R5 | 3.5411E+01 | −4.9102E−01 | 1.8808E+00 | −6.3480E+00 | 1.7532E+01 | −3.6737E+01 |
| R6 | 1.2943E+01 | −4.8645E−01 | 8.5725E−01 | −4.1347E+00 | 1.4494E+01 | −3.3361E+01 |
| R7 | −2.2480E+01 | −1.1782E−01 | 3.0751E−01 | −2.2101E+00 | 7.1418E+00 | −1.4231E+01 |
| R8 | −1.5154E+00 | 1.7534E−01 | 1.7133E−02 | −1.2519E+00 | 3.8767E+00 | −6.5629E+00 |
| R9 | −8.7982E+01 | −3.2268E−01 | −2.4907E−01 | 1.0056E+00 | −1.2800E+00 | 9.8916E−01 |
| R10 | −3.8479E+00 | −3.0949E−01 | 3.2439E−01 | −2.3879E−01 | 1.2759E−01 | −4.9897E−02 |

| | Conic coefficient | Aspheric coefficient | | | |
|---|---|---|---|---|---|
| | k | A14 | A16 | A18 | A20 |
| R1 | 1.3370E−01 | 6.9770E+02 | −1.4076E+03 | 1.5778E+03 | −7.5717E+02 |
| R2 | −2.5834E−01 | −8.2372E+02 | 1.9926E+03 | −2.6713E+03 | 1.5123E+03 |
| R3 | −8.8577E+01 | −1.5942E+01 | 2.4723E+02 | −4.3799E+02 | 2.5454E+02 |
| R4 | −2.9956E+01 | 1.0373E+02 | −9.9846E+01 | 5.4272E+01 | −1.2545E+01 |
| R5 | 3.5411E+01 | 5.3565E+01 | −4.9408E+01 | 2.5598E+01 | −5.6561E+00 |
| R6 | 1.2943E+01 | 4.8791E+01 | −4.3736E+01 | 2.1888E+01 | −4.6421E+00 |
| R7 | −2.2480E+01 | 1.8955E+01 | −1.7197E+01 | 1.0551E+01 | −4.2065E+00 |
| R8 | −1.5154E+00 | 7.1877E+00 | −5.2014E+00 | 2.4542E+00 | −7.2540E−01 |
| R9 | −8.7982E+01 | −5.0749E−01 | 1.7580E−01 | −4.0669E−02 | 6.0279E−03 |
| R10 | −3.8479E+00 | 1.4214E−02 | −2.9005E−03 | 4.1097E−04 | −3.8221E−05 |

Table 11 and Table 12 show design data of inflection points and stationary points of each lens in the camera optical lens 30 of the present embodiment.

TABLE 11

| | Number of inflection points | Inflection points position 1 | Inflection points position 2 | Inflection points position 3 | Inflection points position 4 | Inflection points position 5 | Inflection points position 6 |
|---|---|---|---|---|---|---|---|
| P1R1 | 0 | / | / | / | / | / | / |
| P1R2 | 1 | 0.515 | / | / | / | / | / |
| P2R1 | 1 | 0.095 | / | / | / | / | / |
| P2R2 | 1 | 0.335 | / | / | / | / | / |
| P3R1 | 2 | 0.155 | 0.705 | / | / | / | / |
| P3R2 | 2 | 0.135 | 0.945 | / | / | / | / |
| P4R1 | 2 | 0.385 | 1.155 | / | / | / | / |
| P4R2 | 1 | 0.845 | / | / | / | / | / |
| P5R1 | 2 | 0.225 | 1.055 | / | / | / | / |
| P5R2 | 1 | 0.445 | / | / | / | / | / |

TABLE 12

| | Number of stationary points | Stationary point position 1 | Stationary point position 2 | Stationary point position 3 | Stationary point position 4 | Stationary point position 5 |
|---|---|---|---|---|---|---|
| P1R1 | 0 | / | / | / | / | / |
| P1R2 | 0 | / | / | / | / | / |
| P2R1 | 1 | 0.155 | / | / | / | / |
| P2R2 | 1 | 0.595 | / | / | / | / |
| P3R1 | 2 | 0.285 | 0.855 | / | / | / |
| P3R2 | 1 | 0.235 | / | / | / | / |
| P4R1 | 1 | 0.625 | / | / | / | / |
| P4R2 | 1 | 1.265 | / | / | / | / |
| P5R1 | 2 | 0.405 | 1.625 | / | / | / |
| P5R2 | 1 | 1.525 | / | / | / | / |

Figure 10:
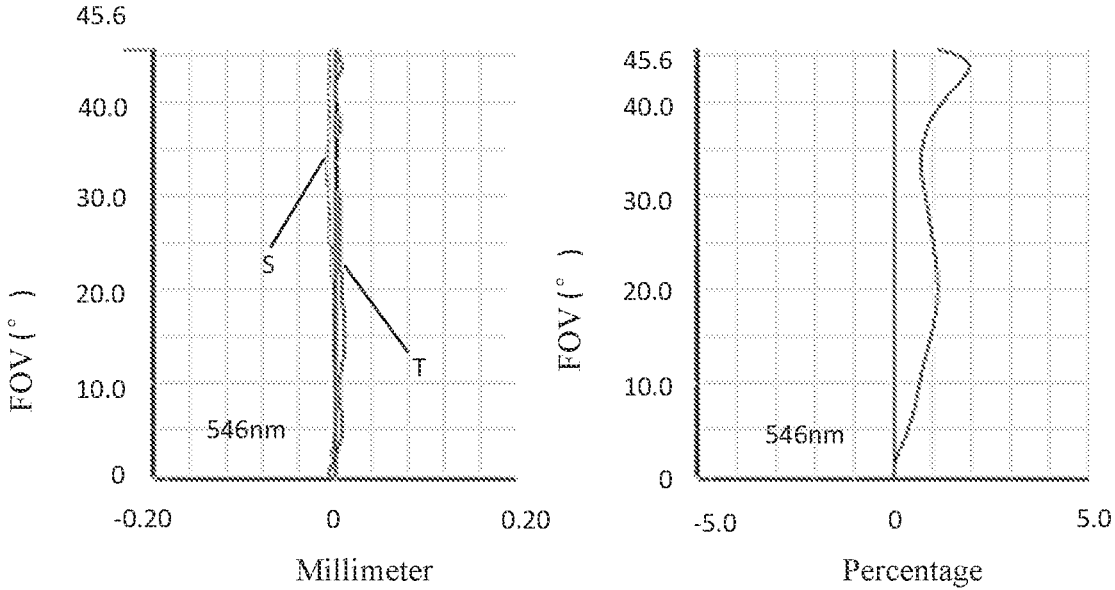
FIG. 10 is a schematic diagram of field curvature and distortion of the camera optical lens shown in FIG. 9.
Figure 11:
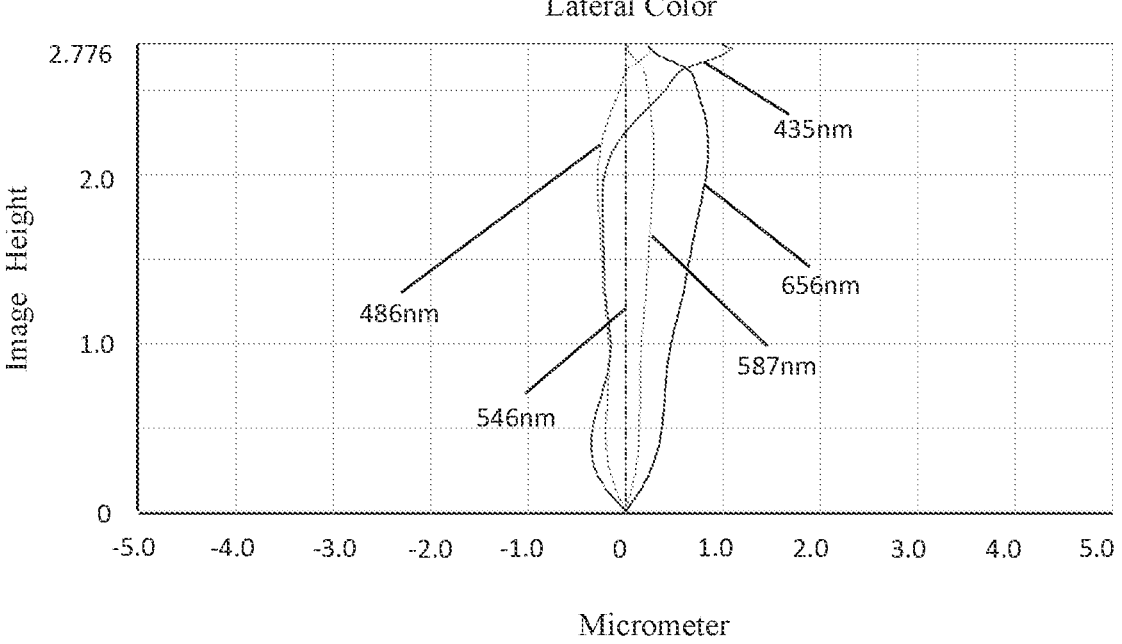
FIG. 11 is a schematic diagram of lateral color of the camera optical lens shown in FIG. 9.
Figure 12:
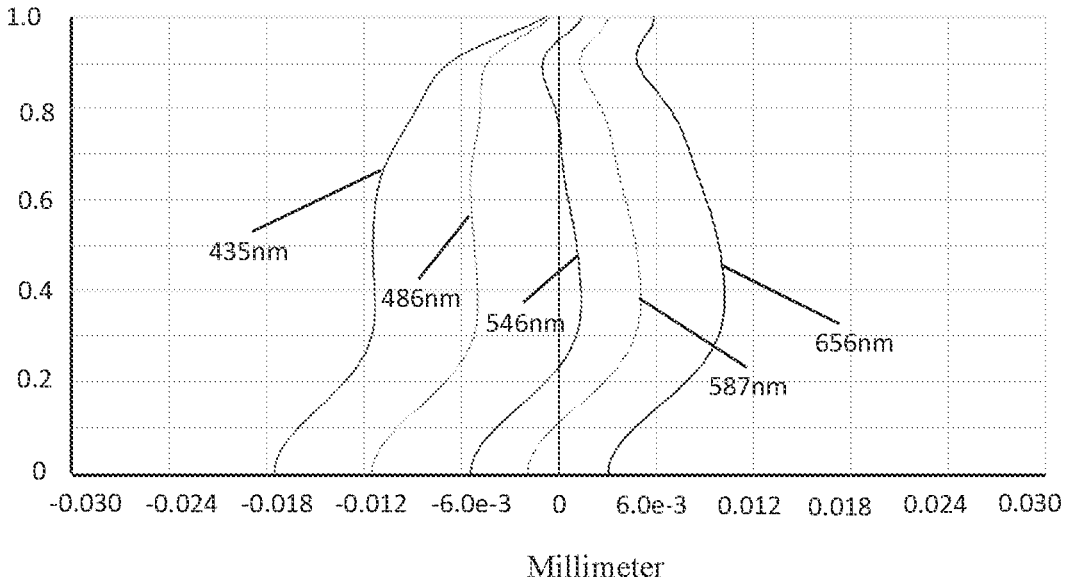
FIG. 12 is a schematic diagram of longitudinal aberration of the camera optical lens shown in FIG. 9.

FIG. 10 shows field curvature and distortion of light with a wavelength of 546 nm after passing through the camera optical lens 30. The field curvature S in FIG. 10 is the field curvature in the sagittal direction, and T is the field curvature in the meridional direction. FIG. 11 and FIG. 12 respectively show lateral color and longitudinal aberration of light with wavelengths of 656 nm, 587 nm, 546 nm, 486 nm and 435 nm after passing through the camera optical lens 30.

As shown in Table 21, Embodiment 3 satisfies each relational expression.

In this embodiment, the entrance pupil diameter ENPD of the camera optical lens 30 is 1.208 mm, the full field of view image height IH is 2.626 mm, and the field of view FOV in the diagonal direction is 87.63°, so that the camera optical lens 30 meets the design requirements of a large-aperture, a wide-angle, and an ultra-thinness, and the on-axis and off-axis chromatic aberration thereof is sufficiently compensated for, and it has excellent optical characteristics.

Embodiment 4

Figure 13:
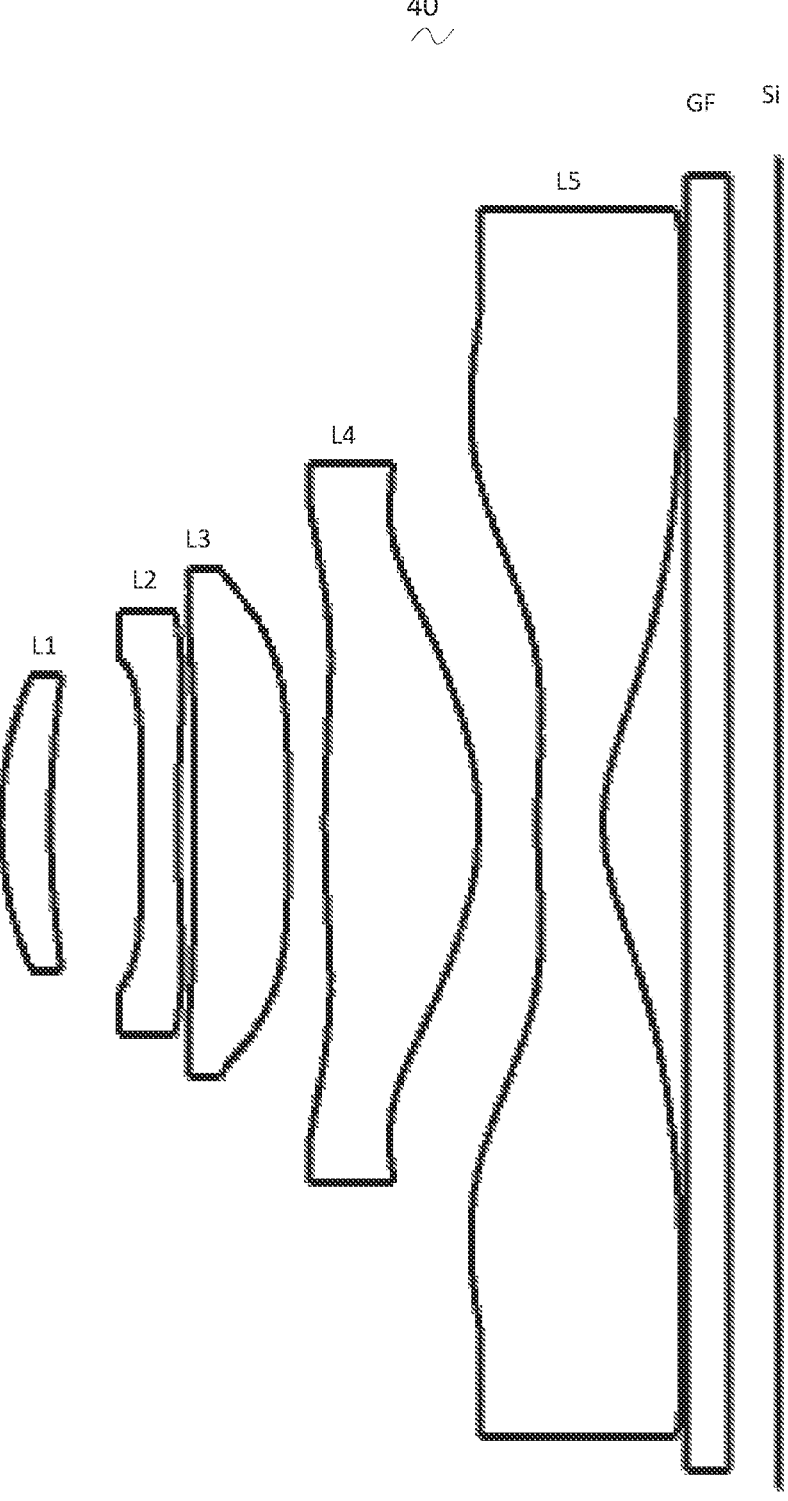
FIG. 13 is a structural schematic diagram of a camera optical lens as described in Embodiment 4 of the present disclosure.

FIG. 13 is a structural schematic diagram of the camera optical lens 40 in Embodiment 4, Embodiment 4 is substantially the same as Embodiment 1, and the symbols in the following list have the same meaning as those in Embodiment 1, so the same parts are not described herein again.

In Embodiment 4, the third lens L3 has a positive refractive power.

Table 13 and Table 14 show design data of the camera optical lens 40 shown in FIG. 13.

TABLE 13

| | R | d | | nd | | vd | |
|---|---|---|---|---|---|---|---|
| S1 | ∞ | d0= | −0.101 | | | | |
| R1 | 1.372 | d1= | 0.245 | nd1 | 1.5444 | v1 | 0.00 |
| R2 | 3.316 | d2= | 0.450 | | | | |
| R3 | 21.553 | d3= | 0.183 | nd2 | 1.6770 | v2 | 19.40 |
| R4 | 3.576 | d4= | 0.080 | | | | |
| R5 | 9.396 | d5= | 0.468 | nd3 | 1.5618 | v3 | 43.27 |
| R6 | 18.091 | d6= | 0.185 | | | | |
| R7 | 4.171 | d7= | 0.767 | nd4 | 1.5440 | v4 | 56.00 |
| R8 | −1.043 | d8= | 0.292 | | | | |
| R9 | 2.519 | d9= | 0.327 | nd5 | 1.5666 | v5 | 37.18 |
| R10 | 0.667 | d10= | 0.416 | | | | |
| R11 | ∞ | d11= | 0.210 | ndg | 1.5168 | vg | 64.17 |
| R12 | ∞ | d12= | 0.244 | | | | |

Table 14 shows aspherical surface data of each lens in the camera optical lens 40 as described in Embodiment 4 of the present disclosure.

TABLE 14

| | Conic coefficient | Aspheric coefficient | | | | |
|---|---|---|---|---|---|---|
| | k | A4 | A6 | A8 | A10 | A12 |
| R1 | 1.5905E−01 | 1.9519E−02 | 3.0964E−01 | −4.1670E+00 | 3.6801E+01 | −2.0731E+02 |
| R2 | 1.6427E−01 | 1.4288E−02 | −1.6920E−01 | 2.4968E+00 | −2.9227E+01 | 2.0150E+02 |
| R3 | −9.3424E+01 | −3.5893E−01 | 7.4455E−01 | −6.2162E+00 | 2.3628E+01 | −5.5177E+01 |
| R4 | −3.2148E+01 | −3.3476E−01 | 1.4476E+00 | −6.5815E+00 | 2.0579E+01 | −4.4733E+01 |
| R5 | −4.0728E+00 | −4.1355E−01 | 1.2697E+00 | −3.7923E+00 | 9.7914E+00 | −1.9328E+01 |
| R6 | 3.9423E+01 | −4.2939E−01 | 7.6207E−01 | −3.6658E+00 | 1.2111E+01 | −2.6323E+01 |
| R7 | −1.5529E+01 | −1.4524E−01 | 4.3616E−01 | −2.1175E+00 | 5.7525E+00 | −1.0122E+01 |
| R8 | −1.6000E+00 | 1.4359E−01 | 3.7349E−02 | −8.6158E−01 | 2.3142E+00 | −3.5032E+00 |
| R9 | −8.1986E+01 | −2.5826E−01 | −1.5073E−01 | 5.2749E−01 | −5.3919E−01 | 3.2983E−01 |
| R10 | −3.7387E+00 | −2.3636E−01 | 1.9336E−01 | −1.0145E−01 | 3.3771E−02 | −5.8692E−03 |

| | Conic coefficient | Aspheric coefficient | | | |
|---|---|---|---|---|---|
| | k | A14 | A16 | A18 | A20 |
| R1 | 1.5905E−01 | 7.3527E+02 | −1.5904E+03 | 1.9045E+03 | −9.7075E+02 |
| R2 | 1.6427E−01 | −8.7472E+02 | 2.2934E+03 | −3.3226E+03 | 2.0257E+03 |
| R3 | −9.3424E+01 | 5.2915E+01 | 3.5881E+01 | −1.2764E+02 | 7.2916E+01 |
| R4 | −3.2148E+01 | 6.5320E+01 | −6.0355E+01 | 3.1517E+01 | −7.0009E+00 |
| R5 | −4.0728E+00 | 2.6634E+01 | −2.3331E+01 | 1.1539E+01 | −2.4441E+00 |
| R6 | 3.9423E+01 | 3.6662E+01 | −3.1476E+01 | 1.5127E+01 | −3.0841E+00 |
| R7 | −1.5529E+01 | 1.2088E+01 | −9.8248E+00 | 5.3528E+00 | −1.8743E+00 |
| R8 | −1.6000E+00 | 3.4611E+00 | −2.2633E+00 | 9.6472E−01 | −2.5750E−01 |
| R9 | −8.1986E+01 | −1.3392E−01 | 3.6851E−02 | −6.7964E−03 | 8.0508E−04 |
| R10 | −3.7387E+00 | −2.1529E−04 | 3.8698E−04 | −9.7715E−05 | 1.2595E−05 |

Table 15 and Table 16 show design data of inflection points and stationary points of each lens in the camera optical lens 40 of the present embodiment.

TABLE 15

|  | Number of inflection points | Inflection points position 1 | Inflection points position 2 | Inflection points position 3 | Inflection points position 4 | Inflection points position 5 | Inflection points position 6 |
|---|---|---|---|---|---|---|---|
| P1R1 | 0 | / | / | / | / | / | / |
| P1R2 | 1 | 0.525 | / | / | / | / | / |
| P2R1 | 1 | 0.115 | / | / | / | / | / |
| P2R2 | 1 | 0.325 | / | / | / | / | / |
| P3R1 | 2 | 0.165 | 0.735 | / | / | / | / |
| P3R2 | 2 | 0.115 | 0.965 | / | / | / | / |
| P4R1 | 3 | 0.405 | 1.115 | 1.245 | / | / | / |
| P4R2 | 1 | 0.885 | / | / | / | / | / |
| P5R1 | 2 | 0.235 | 1.125 | / | / | / | / |
| P5R2 | 1 | 0.485 | / | / | / | / | / |

TABLE 16

|  | Number of stationary points | Stationary point position 1 | Stationary point position 2 | Stationary point position 3 | Stationary point position 4 | Stationary point position 5 |
|---|---|---|---|---|---|---|
| P1R1 | 0 | / | / | / | / | / |
| P1R2 | 0 | / | / | / | / | / |
| P2R1 | 1 | 0.185 | / | / | / | / |
| P2R2 | 1 | 0.575 | / | / | / | / |
| P3R1 | 2 | 0.305 | 0.915 | / | / | / |
| P3R2 | 1 | 0.185 | / | / | / | / |
| P4R1 | 1 | 0.675 | / | / | / | / |
| P4R2 | 1 | 1.315 | / | / | / | / |
| P5R1 | 2 | 0.445 | 1.735 | / | / | / |
| P5R2 | 1 | 2.195 | / | / | / | / |

Figure 14:
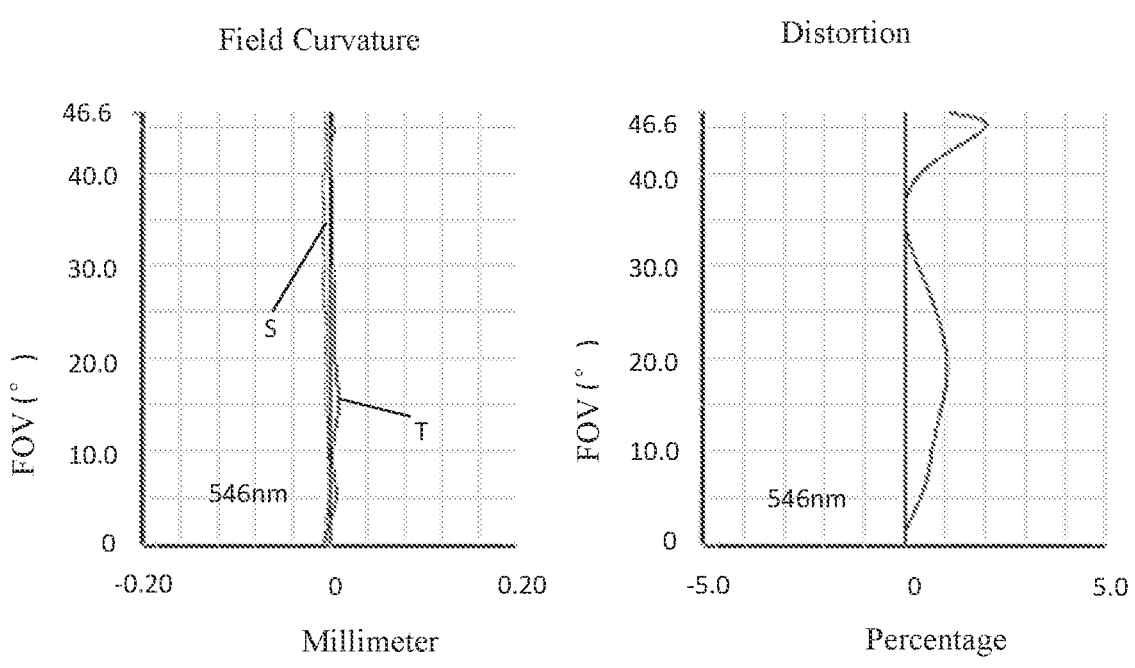
FIG. 14 is a schematic diagram of field curvature and distortion of the camera optical lens shown in FIG. 13.
Figure 15:
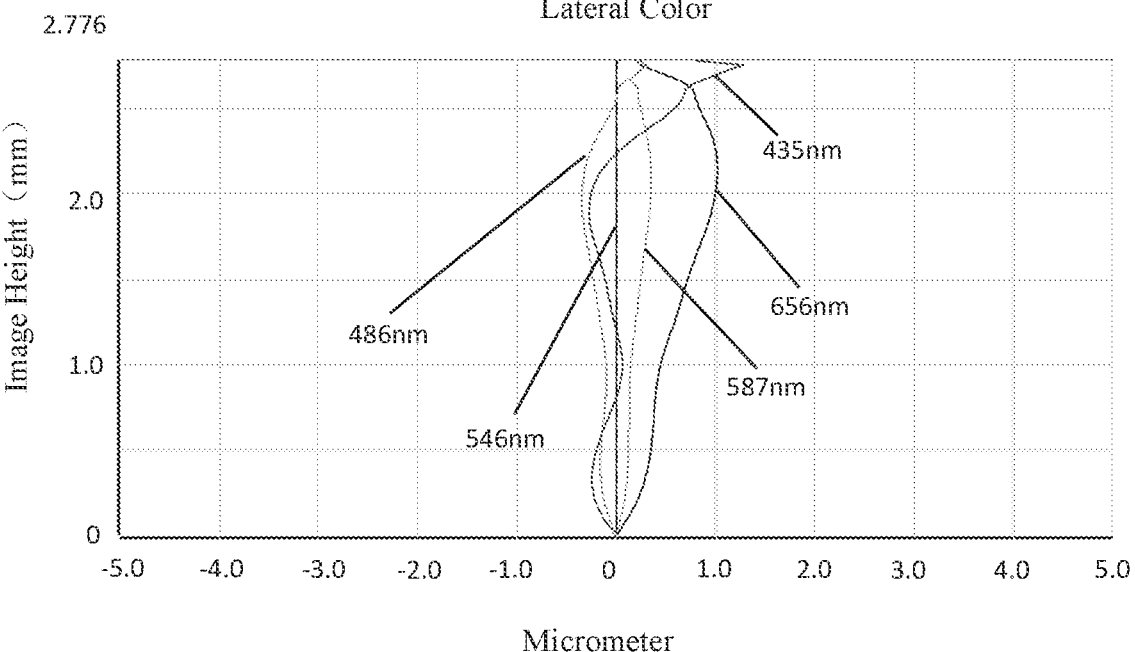
FIG. 15 is a schematic diagram of lateral color of the camera optical lens shown in FIG. 13.
Figure 16:
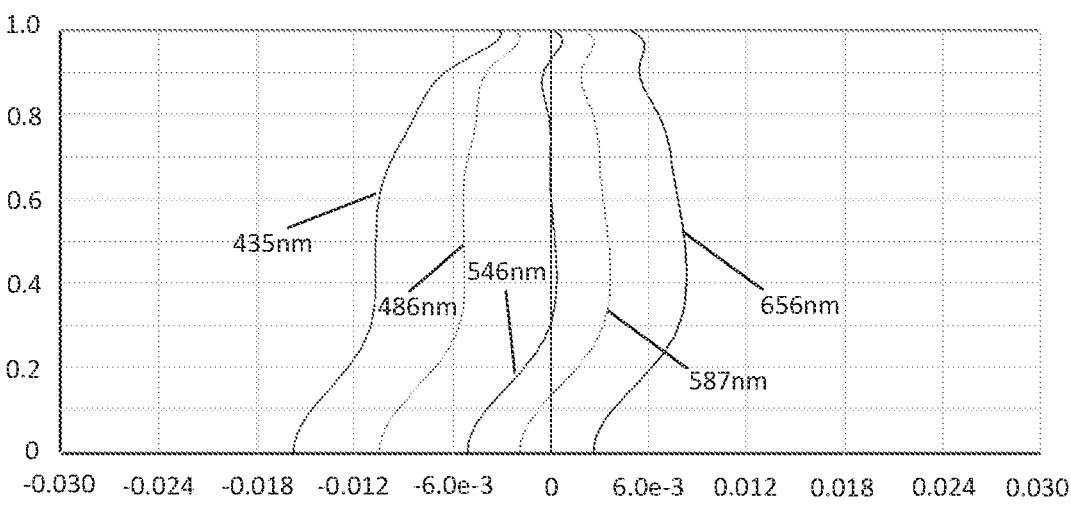
FIG. 16 is a schematic diagram of longitudinal aberration of the camera optical lens shown in FIG. 13.

FIG. 14 shows field curvature and distortion of light with a wavelength of 546 nm after passing through the camera optical lens 40. The field curvature S in FIG. 14 is the field curvature in the sagittal direction, and T is the field curvature in the meridional direction. FIG. 15 and FIG. 16 respectively show lateral color and longitudinal aberration of light with wavelengths of 656 nm, 587 nm, 546 nm, 486 nm and 435 nm after passing through the camera optical lens 40.

As shown in Table 21, Embodiment 4 satisfies each relational expression.

In this embodiment, the entrance pupil diameter ENPD of the camera optical lens 40 is 1.170 mm, the full field of view image height IH is 2.626 mm, and the field of view FOV in the diagonal direction is 89.49°, so that the camera optical lens 40 meets the design requirements of a large-aperture, a wide-angle, and an ultra-thinness, and the on-axis and off-axis chromatic aberration thereof is sufficiently compensated for, and it has excellent optical characteristics.

(Comparative Example)

Figure 17:
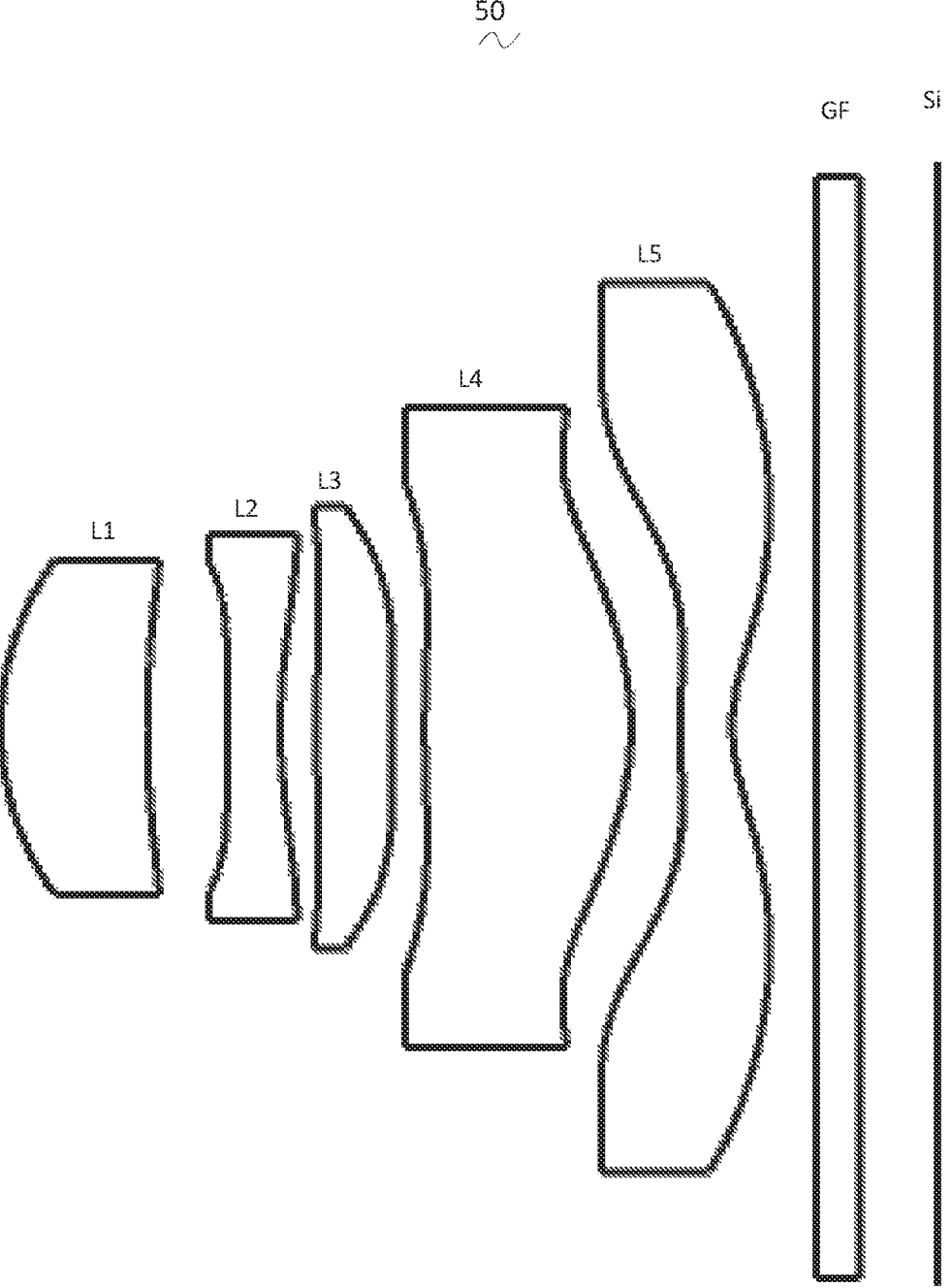
FIG. 17 is a structural schematic diagram of a camera optical lens as described in the Comparative Example of the present disclosure.

FIG. 17 is a structural schematic diagram of the camera optical lens 50 in the Comparative Example, and the symbols in the following list have the same meaning as those in Embodiment 1, so the same parts are not described herein again.

In the Comparative Example, the third lens L3 has a positive refractive power.

Table 17 and Table 18 show design data of the camera optical lens 50 shown in FIG. 17.

TABLE 17

|  | R |  | d |  | nd |  | vd |
|---|---|---|---|---|---|---|---|
| S1 | ∞ | d0= | -0.214 |  |  |  |  |
| R1 | 1.460 | d1= | 0.709 | nd1 | 1.5444 | v1 | 0.00 |
| R2 | 5.219 | d2= | 0.384 |  |  |  |  |
| R3 | 13.796 | d3= | 0.261 | nd2 | 1.6770 | v2 | 19.40 |
| R4 | 2.703 | d4= | 0.174 |  |  |  |  |
| R5 | 8.421 | d5= | 0.367 | nd3 | 1.6034 | v3 | 29.22 |
| R6 | 11.294 | d6= | 0.156 |  |  |  |  |
| R7 | 5.698 | d7= | 1.000 | nd4 | 1.6142 | v4 | 25.62 |
| R8 | -1.425 | d8= | 0.238 |  |  |  |  |
| R9 | 2.969 | d9= | 0.250 | nd5 | 1.6464 | v5 | 21.64 |
| R10 | 0.819 | d10= | 0.406 |  |  |  |  |
| R11 | ∞ | d11= | 0.210 | ndg | 1.5168 | vg | 64.17 |
| R12 | ∞ | d12= | 0.378 |  |  |  |  |

Table 18 shows aspherical surface data of each lens in the camera optical lens 50 as described in the Comparative Example of the present disclosure.

TABLE 18

|  | Conic coefficient | Aspheric coefficient | | | | |
|---|---|---|---|---|---|---|
|  | k | A4 | A6 | A8 | A10 | A12 |
| R1 | 8.1429E-02 | 6.3937E-03 | 1.5462E-02 | 2.7289E-02 | -5.5622E-01 | 3.0937E+00 |
| R2 | 1.0248E+01 | -1.1890E-02 | 6.0199E-02 | -7.2124E-01 | 4.5744E+00 | -1.8121E+01 |
| R3 | 9.9000E+01 | -2.0596E-01 | -3.0984E-02 | 1.9246E-02 | -2.2688E+00 | 1.4503E+01 |

TABLE 18-continued

| | | | | | |
|---|---|---|---|---|---|
| R4 | −4.1647E+00 | −1.1462E−01 | 1.0739E−01 | −2.7611E−01 | 1.8241E−01 | 1.0072E+00 |
| R5 | −2.3060E+00 | −1.4376E−01 | 3.2835E−01 | −5.4646E−01 | 3.0279E−01 | 5.1478E−01 |
| R6 | 9.3780E+01 | −3.6043E−01 | 4.2875E−01 | −1.2173E+00 | 3.4569E+00 | −7.1382E+00 |
| R7 | −1.5988E+01 | −1.5380E−01 | 1.3560E−01 | −6.9612E−01 | 2.3442E+00 | −4.7726E+00 |
| R8 | −1.7284E+00 | 1.6072E−01 | −2.2510E−01 | 5.0665E−02 | 4.7234E−01 | −9.8761E−01 |
| R9 | −9.9000E+01 | −4.1189E−01 | 1.4100E−01 | 2.8957E−01 | −5.2224E−01 | 4.6719E−01 |
| R10 | −5.3228E+00 | −3.2643E−01 | 3.3745E−01 | −2.5234E−01 | 1.3488E−01 | −5.0249E−02 |

| | Conic coefficient | Aspheric coefficient | | | |
|---|---|---|---|---|---|
| | k | A14 | A16 | A18 | A20 |
| R1 | 8.1429E−02 | −8.7842E+00 | 1.3889E+01 | −1.1631E+01 | 4.0250E+00 |
| R2 | 1.0248E+01 | 4.3855E+01 | −6.3511E+01 | 5.0286E+01 | −1.6774E+01 |
| R3 | 9.9000E+01 | −4.4273E+01 | 7.2587E+01 | −6.2311E+01 | 2.1941E+01 |
| R4 | −4.1647E+00 | −3.0740E+00 | 3.8917E+00 | −2.4279E+00 | 6.1524E−01 |
| R5 | −2.3060E+00 | −1.3871E+00 | 1.4109E+00 | −6.5115E−01 | 1.0595E−01 |
| R6 | 9.3780E+01 | 9.5226E+00 | −7.8326E+00 | 3.6228E+00 | −7.1562E−01 |
| R7 | −1.5988E+01 | 6.4056E+00 | −5.8308E+00 | 3.5677E+00 | −1.3997E+00 |
| R8 | −1.7284E+00 | 1.0844E+00 | −7.3956E−01 | 3.1986E−01 | −8.5364E−02 |
| R9 | −9.9000E+01 | −2.6368E−01 | 9.8026E−02 | −2.3991E−02 | 3.7297E−03 |
| R10 | −5.3228E+00 | 1.2409E−02 | −1.7771E−03 | 6.7344E−05 | 2.1645E−05 |

Table 19 and Table 20 show design data of inflection points and stationary points of each lens in the camera optical lens 50 of the present embodiment.

TABLE 19

| | Number of inflection points | Inflection points position 1 | Inflection points position 2 | Inflection points position 3 | Inflection points position 4 | Inflection points position 5 | Inflection points position 6 |
|---|---|---|---|---|---|---|---|
| P1R1 | 0 | / | / | / | / | / | / |
| P1R2 | 1 | 0.675 | / | / | / | / | / |
| P2R1 | 1 | 0.175 | / | / | / | / | / |
| P2R2 | 1 | 0.535 | / | / | / | / | / |
| P3R1 | 3 | 0.375 | 0.985 | 1.005 | / | / | / |
| P3R2 | 2 | 0.155 | 1.005 | / | / | / | / |
| P4R1 | 1 | 0.315 | / | / | / | / | / |
| P4R2 | 1 | 0.875 | / | / | / | / | / |
| P5R1 | 2 | 0.205 | 1.095 | / | / | / | / |
| P5R2 | 1 | 0.405 | / | / | / | / | / |

TABLE 20

| | Number of stationary points | Stationary point position 1 | Stationary point position 1 | Stationary point position 1 | Stationary point position 1 | Stationary point position 1 |
|---|---|---|---|---|---|---|
| P1R1 | 0 | / | / | / | / | / |
| P1R2 | 0 | / | / | / | / | / |
| P2R1 | 1 | 0.295 | / | / | / | / |
| P2R2 | 0 | / | / | / | / | / |
| P3R1 | 1 | 0.685 | / | / | / | / |
| P3R2 | 1 | 0.265 | / | / | / | / |
| P4R1 | 1 | 0.555 | / | / | / | / |
| P4R2 | 1 | 1.335 | / | / | / | / |
| P5R1 | 2 | 0.375 | 1.805 | / | / | / |
| P5R2 | 1 | 1.085 | / | / | / | / |

Figure 18:
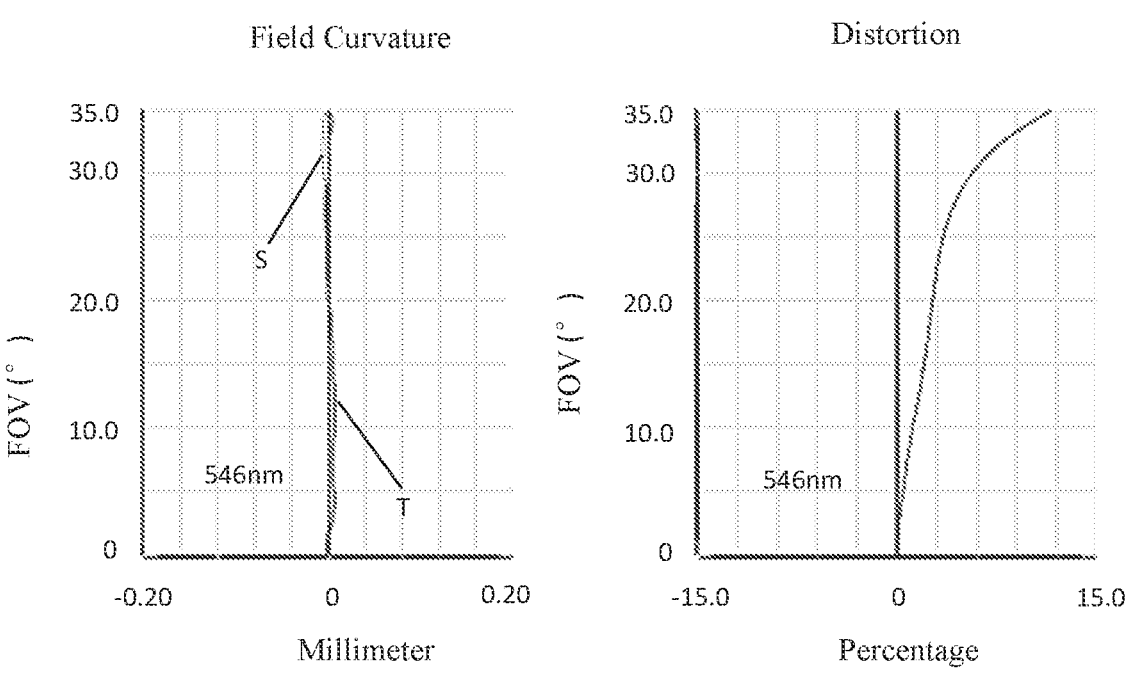
FIG. 18 is a schematic diagram of field curvature and distortion of the camera optical lens shown in FIG. 17.
Figure 19:
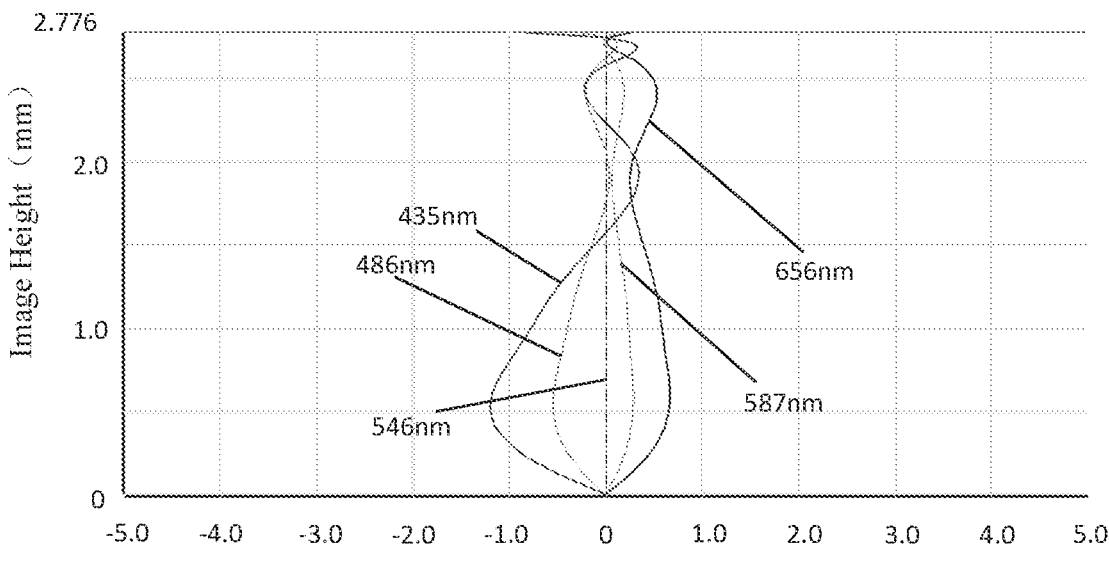
FIG. 19 is a schematic diagram of lateral color of the camera optical lens shown in FIG. 17.
Figure 20:
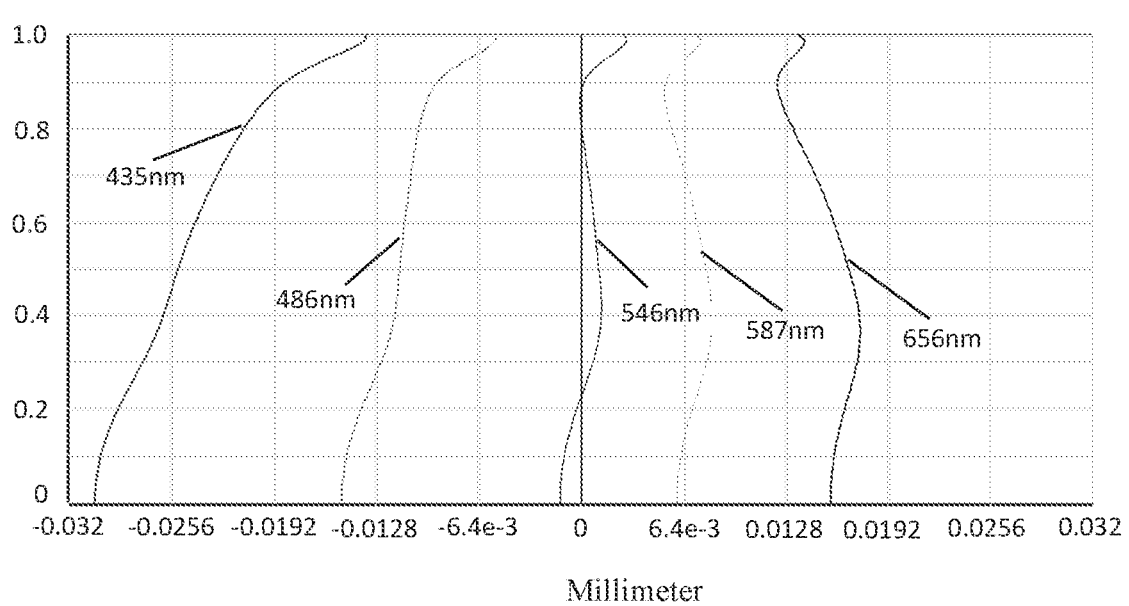
FIG. 20 is a schematic diagram of longitudinal aberration of the camera optical lens shown in FIG. 17.

FIG. 18 shows field curvature and distortion of light with a wavelength of 546 nm after passing through the camera optical lens 50. The field curvature S in FIG. 18 is the field curvature in the sagittal direction, and T is the field curvature in the meridional direction. FIG. 19 and FIG. 20 respectively show lateral color and longitudinal aberration of light with wavelengths of 656 nm, 587 nm, 546 nm, 486 nm and 435 nm after passing through the camera optical lens 50.

In this Comparative Example, the entrance pupil diameter ENPD of the camera optical lens 50 is 1.592 mm, the full field of view image height IH is 2.626 mm, and the field of view FOV in the diagonal direction is 67.86°

Table 21 shows the values corresponding to the parameters specified in the values and relational expression in embodiments 1-4 and the Comparative Examples. Obviously, the camera optical lens 50 in the Comparative Example does not satisfy the above relational expression: 1.10≤f1/f≤1.60. The camera optical lens 50 cannot effectively take into account large-aperture, ultra-thinness and wide-angle, and has insufficient optical performance.

TABLE 21

| Parameters and relational expressions | Embodiment 1 | Embodiment 2 | Embodiment 3 | Embodiment 4 | Comparative Example |
|---|---|---|---|---|---|
| f1/f | 1.36 | 1.10 | 1.46 | 1.59 | 0.99 |
| d3/d4 | 2.32 | 1.86 | 2.62 | 2.28 | 1.50 |
| R7/R8 | −5.70 | −4.57 | −4.00 | −4.00 | −4.00 |
| (R3 + R4)/ (R3 − R4) | 1.17 | 1.03 | 1.25 | 1.40 | 1.49 |
| f | 2.779 | 3.278 | 2.658 | 2.574 | 3.502 |
| f1 | 3.772 | 3.619 | 3.891 | 4.097 | 3.476 |
| f2 | −6.203 | −4.879 | −6.187 | −6.282 | −4.954 |
| f3 | −305.155 | 254.434 | 146.357 | 33.954 | 51.903 |
| f4 | 1.526 | 1.725 | 1.569 | 1.611 | 1.943 |
| f5 | −1.687 | −1.804 | −1.701 | −1.700 | −1.815 |
| f12 | 7.039 | 7.775 | 7.665 | 8.509 | 6.491 |
| FNO | 2.20 | 2.20 | 2.20 | 2.20 | 2.20 |
| SD | 0.64 | 0.77 | 0.63 | 0.61 | 0.82 |

Those skilled in the art can understand that the above embodiments are embodiments for implementing the present disclosure, and in practical applications, various changes may be made in form and detail without departing from the spirit and scope of the present disclosure.

What is claimed is:

1. A camera optical lens, comprising from an object side to an image side:

a first lens having a positive refractive power;

a second lens having a negative refractive power;

a third lens having a refractive power;

a fourth lens having a positive refractive power; and a fifth lens having a negative refractive power;

wherein, a focal length of the camera optical lens is f, a focal length of the first lens is f1, an on-axis thickness of the second lens is d3, an on-axis distance from an image-side surface of the second lens to an object-side surface of the third lens is d4, a curvature radius of an object-side surface of the second lens is R3, a curvature radius of the image-side surface of the second lens is R4, a curvature radius of an object-side surface of the fourth lens is R7, a curvature radius of an image-side surface of the fourth lens is R8, following relational expressions are satisfied:

$$1.10 \le f1/f \le 1.60;$$

$$1.50 \le d3/d4 \le 3.50;$$

$$-8.00 \le R7/R8 \le -4.00; \text{ and}$$

$$1.00 \le (R3 + R4)/(R3 - R4) \le 1.80.$$

2. The camera optical lens as described in claim 1, wherein a focal length of the second lens is f2, a following relational expression is satisfied:

$$-4.50 \le f2/f \le -150.$$

3. The camera optical lens as described in claim 1, wherein a total optical length from an object-side surface of the first lens to an image plane of the camera optical lens along an optic axis of the camera optical lens is TTL, and an on-axis thickness of the fifth lens is d9, a following relational expression is satisfied:

$$6.00 \le TTL/d9 \le 20.00.$$

4. The camera optical lens as described in claim 1, wherein an object-side surface of the first lens is convex in a paraxial region, and an image-side surface of the first lens is concave in the paraxial region;

a curvature radius of an object-side surface of the first lens is R1, a curvature radius of an image-side surface of the first lens is R2, a total optical length from the object-side surface of the first lens to an image plane of the camera optical lens along an optic axis of the camera optical lens is TTL, and an on-axis thickness of the first lens is d1, following relational expressions are satisfied:

$$-2.42 \le (R1 + R2)/(R1 - R2) \le -1.97; \text{ and}$$

$$0.06 \le d1/TTL \le 0.11.$$

5. The camera optical lens as described in claim 1, wherein an object-side surface of the second lens is convex in a paraxial region, and an image-side surface of the second lens is concave in the paraxial region;

a total optical length from an object-side surface of the first lens to an image plane of the camera optical lens along an optic axis of the camera optical lens is TTL, and an on-axis thickness of the second lens is d3, a following relational expression is satisfied:

$$0.03 \le d3/TTL \le 0.06.$$

6. The camera optical lens as described in claim 1, wherein an object-side surface of the third lens is convex in a paraxial region, and an image-side surface of the third lens is concave in the paraxial region;

a focal length of the third lens is f3, a curvature radius of an object-side surface of the third lens is R5, a curvature radius of an image-side surface of the third lens is R6, a total optical length from an object-side surface of the first lens to an image plane of the camera optical lens along an optic axis of the camera optical lens is TTL, and an on-axis thickness of the third lens is d5, following relational expressions are satisfied:

$$-109.81 \le f3/f \le 77.62;$$
$$-29.33 \le (R5+R6)/(R5-R6) \le 25.94; \text{ and}$$
$$0.10 \le d5/TTL \le 0.13.$$

7. The camera optical lens as described in claim 1, wherein an object-side surface of the fourth lens is convex in a paraxial region, and an image-side surface of the fourth lens is convex in the paraxial region;

a focal length of the fourth lens is f4, a curvature radius of an object-side surface of the fourth lens is R7, a curvature radius of an image-side surface of the fourth lens is R8, a total optical length from an object-side surface of the first lens to an image surface of the camera optical lens along an optical axis is TTL, and an on-axis thickness of the fourth lens is d7, following relational expressions are satisfied:

$$0.52 \le f4/f \le 0.63;$$
$$0.60 \le (R7+R8)/(R7-R8) \le 0.71; \text{ and}$$
$$0.15 \le d7/TTL \le 0.21.$$

8. The camera optical lens as described in claim 1, wherein an object-side surface of the fifth lens is convex in a paraxial region, and an image-side surface of the fifth lens is concave in the paraxial region;

a focal length of the fifth lens is f5, a curvature radius of an object-side surface of the fifth lens is R9, and a curvature radius of an image-side surface of the fifth lens is R10, following relational expressions are satisfied:

$$-0.66 \le f5/f \le -0.55; \text{ and}$$
$$1.56 \le (R9+R10)/(R9-R10) \le 1.79.$$

9. The camera optical lens as described in claim 1, wherein a field of view of the camera optical lens is FOV, a following relational expression is satisfied:

$$FOV \ge 75.00°.$$

10. The camera optical lens as described in claim 1, wherein a half aperture of the object-side surface of the first lens is less than or equal to 0.85 mm.

\* \* \* \* \*